(12) United States Patent
Miyachi et al.

(10) Patent No.: US 8,932,509 B2
(45) Date of Patent: Jan. 13, 2015

(54) SOLID ELECTROLYTE MEMBRANE, METHOD AND APPARATUS OF PRODUCING THE SAME, MEMBRANE ELECTRODE ASSEMBLY, AND FUEL CELL

(75) Inventors: Hiroshi Miyachi, Kanagawa (JP); Ryo Takeda, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1424 days.

(21) Appl. No.: 11/994,966

(22) PCT Filed: Jul. 6, 2006

(86) PCT No.: PCT/JP2006/313926
§ 371 (c)(1),
(2), (4) Date: Jan. 7, 2008

(87) PCT Pub. No.: WO2007/007825
PCT Pub. Date: Jan. 18, 2007

(65) Prior Publication Data
US 2009/0081518 A1    Mar. 26, 2009

(30) Foreign Application Priority Data

Jul. 7, 2005 (JP) .................................. 2005-198378
Mar. 29, 2006 (JP) .................................. 2006-089809

(51) Int. Cl.
*B01D 67/00* (2006.01)
*B01D 71/36* (2006.01)
(Continued)

(52) U.S. Cl.
CPC ........ *B01D 67/0013* (2013.01); *B01D 67/0011* (2013.01); *B01D 67/0016* (2013.01);
(Continued)

(58) Field of Classification Search
USPC ......... 264/212, 216, 299, 319, 557, 561, 562, 264/330, 334
See application file for complete search history.

(56) References Cited

U.S. PATENT DOCUMENTS 4,840,733 A * 6/1989 Sasaki et al. ............. 210/500.41
4,933,081 A * 6/1990 Sasaki et al. ................. 210/490

(Continued)

FOREIGN PATENT DOCUMENTS

EP    1 304 754 A1    4/2003
EP    1 321 996 A1    6/2003

(Continued)

OTHER PUBLICATIONS

EP Communication, dated Sep. 22, 2009, issued in corresponding EP Application No. 06781046.5, 8 pages.

*Primary Examiner* — Atul P. Khare
(74) *Attorney, Agent, or Firm* — Sughrue Mion, PLLC

(57) ABSTRACT

A dope (24) containing a solid electrolyte and an organic solvent is cast onto a web (111) so as to form a casting membrane (24*a*) thereon. A first blower unit (91) applies dry air to the casting membrane (24*a*). After a lapse of 60 seconds from the casting, a skin layer (24*c*) is formed at an exposed surface (24*b*) side of the casting membrane (24*a*). The casting membrane (24*a*) with the web (111) is brought into contact with a first liquid (65*a*), and thereby reducing a remaining solvent amount of the casting membrane (24*a*). The casting membrane (24*a*) is then peeled from the web (111) as a membrane (62). In a tenter drier (64), the membrane (62) is dried while it is stretched. The membrane (62) is then brought into contact with a second liquid (66*a*). In a drying chamber (69), the membrane (62) is further dried.

15 Claims, 7 Drawing Sheets

(51) Int. Cl.
    *B01D 71/68*     (2006.01)
    *B01D 71/80*     (2006.01)
    *B01D 71/82*     (2006.01)
    *H01B 1/12*     (2006.01)
    *H01M 8/10*     (2006.01)
    *B01D 71/00*     (2006.01)

(52) U.S. Cl.
    CPC ................ *B01D 71/36* (2013.01); *B01D 71/68* (2013.01); *B01D 71/80* (2013.01); *B01D 71/82* (2013.01); *H01B 1/122* (2013.01); *H01M 8/1027* (2013.01); *H01M 8/1032* (2013.01); *H01M 8/1039* (2013.01); *H01M 8/1081* (2013.01); *H01M 2300/0082* (2013.01); *Y02E 60/522* (2013.01); *B01D 2325/10* (2013.01); *B01D 2325/26* (2013.01)
    USPC ............ 264/334; 264/212; 264/299; 264/330

(56) References Cited

U.S. PATENT DOCUMENTS

2003/0118885 A1*   6/2003   Terahara et al. ................ 429/30
2003/0173703 A1    9/2003   Yamazaki et al.
2004/0030005 A1*   2/2004   Katai et al. ..................... 523/340
2004/0212112 A1*  10/2004   Tsujimoto ..................... 264/1.34
2005/0058821 A1*   3/2005   Smith et al. ................. 428/304.4
2005/0186461 A1*   8/2005   Hommura et al. ............. 429/33
2005/0271834 A1*  12/2005   Michihata .................... 428/1.31

FOREIGN PATENT DOCUMENTS

| JP | 05-313014 A | | 11/1993 |
| --- | --- | --- | --- |
| JP | 09-320617 A | | 12/1997 |
| JP | 2001-307752 A | | 11/2001 |
| JP | 2002-231270 A | | 8/2002 |
| JP | 2003-053751 A | | 2/2003 |
| JP | 2004-079378 A | | 3/2004 |
| JP | 2004-131530 A | | 4/2004 |
| JP | 2005-146018 A | | 6/2005 |
| JP | 2005-171025 A | | 6/2005 |
| JP | 2005171025 A | * | 6/2005 |
| WO | 02/25764 A1 | | 3/2002 |

\* cited by examiner

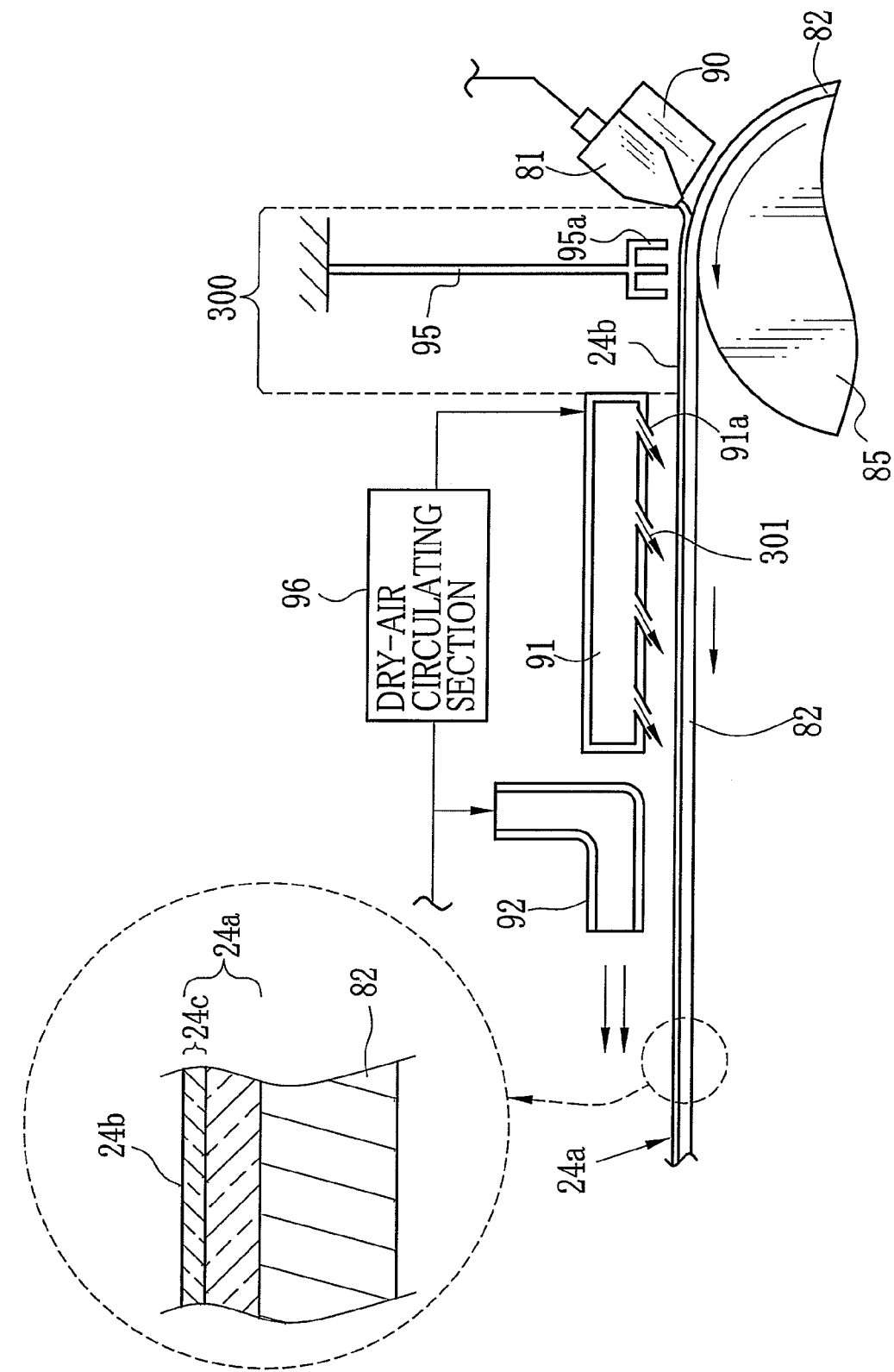

SOLID ELECTROLYTE MEMBRANE, METHOD AND APPARATUS OF PRODUCING THE SAME, MEMBRANE ELECTRODE ASSEMBLY, AND FUEL CELL

TECHNICAL FIELD

The present invention relates to a solid electrolyte membrane, a method and an apparatus of producing the solid electrolyte membrane, and a membrane electrode assembly and a fuel cell using the solid electrolyte membrane. The present invention especially relates to a solid electrolyte membrane having excellent proton conductivity used for a fuel cell, a method and an apparatus of producing the solid electrolyte membrane, and a membrane electrode assembly and a fuel cell using the solid electrolyte membrane.

BACKGROUND ART

A lithium ion battery and a fuel cell that are used as a power source for portable devices have been actively studied in recent years. A solid electrolyte used for the above mentioned battery or cell is also actively studied. The solid electrolyte is, for instance, a lithium ion conducting material or a proton conducting material.

The proton conducting material is generally in the form of a membrane. The solid electrolyte in membrane form, which is used as a solid electrolyte layer of the fuel cell and the like, and its producing method have been proposed. For instance, Japanese Patent Laid-Open Publication No. 9-320617 discloses a method of producing a solid electrolyte membrane by immersing a polyvinylidene fluoride resin in a liquid in which an electrolyte and a plasticizer are mixed. Japanese Patent Laid-Open Publication No. 2001-307752 discloses a method of producing a proton conducting membrane by synthesizing an inorganic compound in a solution containing an aromatic polymer compound with the sulfonic acid group, and removing a solvent therefrom. In this method, oxides of silicon and phosphoric acid derivative are added to the solution in order to improve micropores. Japanese Patent Laid-Open Publication No. 2002-231270 discloses a method of producing an ion-exchange membrane. In this method, metal oxide precursor is added to a solution containing an ion-exchange resin, and a liquid is obtained by applying hydrolysis and polycondensation reaction to the metal oxide precursor. The ion-exchange membrane is obtained by casting the liquid. Japanese Patent Laid-Open Publication No. 2004-079378 discloses a method of producing a proton conducting membrane. In this method, a polymer membrane with a proton conductivity is produced by a solution casting method. The membrane is immersed in an aqueous solution of an organic compound soluble to water and having a boiling point of not less than 100° C., and is allowed to swell to equilibrium. Water is then evaporated by heating. In this way, the proton conducting membrane is produced. Japanese Patent Laid-Open Publication No. 2004-131530 discloses a method of producing a solid electrolyte membrane by dissolving a compound consisting essentially of polybenzimidazole having the anionic groups into an alcohol solvent containing tetraalkylammonium hydroxide and having a boiling point of not less than 90° C. Japanese Patent Laid-Open Publication No. 2005-146018 proposes a method of producing a proton conducting membrane. In this method, a coating liquid including (a) a polymer containing ion conducting component, (b) water-soluble inorganic compound or water-soluble organic compound whose molecular weight is less than 1000 and (c) organic solvent is applied to a support. Then, a dry coating layer is formed by removing (c) organic solvent. Thereafter, the proton conducting membrane is produced by removing (b) water-soluble compound.

A melt-extrusion method and the solution casting method are well known methods of forming a membrane from a polymer.

According to the melt-extrusion method, the membrane can be formed without using a solvent. However, this method has problems in that the polymer may denature by heating, impurities in the polymer remain in the produced membrane, and the like. On the other hand, the solution casting method has a problem in that its producing apparatuses become large and complicated since the method requires a producing apparatus of a solution, a solvent recovery device and the like. However, this method is advantageous since a heating temperature of the membrane can be relatively low and it is possible to remove the impurities in the polymer while producing the solution. The solution casting method has a further advantage in that the produced membrane has better planarity and smoothness than the membrane produced by the melt-extrusion method.

Japanese Patent Laid-Open Publication No. 2005-146018 discloses a method of producing a solid electrolyte membrane by the solution casting method. In this method, a solution containing a polymer having an acid group and a solvent is cast on a support to form a casting membrane. The casting membrane is dried at temperatures of a predetermined value or lower and peeled from the support. The peeled membrane is dried again by heating. In this way, the solid electrolyte membrane is produced.

The solvent of the solid electrolyte has high polarity. The solvent is often basic substance that easily acts with protons. When a solid electrolyte membrane in which the basic substances remained is used for a fuel cell, the basic substances may prevent the protons from passing through the solid electrolyte membrane. As a result, an ionic conductivity of the solid electrolyte membrane is lowered, and the fuel cell cannot express enough electromotive force. In the solution casting method, each drying step is performed over a casting membrane or a membrane in order to remove the solvent from the casting membrane or the membrane. However, the solvent of the solid electrolyte generally has a high boiling point. Therefore, it is often difficult to form the membrane from which the solvent is completely removed by the drying step.

In the above-noted Publication No. 9-320617, the solution casting method is denied and there remains a problem in that the impurities contained in raw materials remains in the produced membrane. The methods disclosed in the above-noted Publication Nos. 2001-307752, 2002-231270, 2004-079378 and 2004-131530 are on a limited scale and not intended to be applied in mass production. The method disclosed in the above-noted Publication No. 2001-307752 has a problem in that it is difficult to disperse a complex consisted of the polymer and the inorganic compound. The method disclosed in the above-noted Publication No. 2002-231270 has a problem in that its membrane producing step is complicated. The method disclosed in the above-noted Publication No. 2004-079378 has a problem in that the produced membrane is not uniform in planarity and smoothness since it has micropores formed during the immersing in the aqueous solution. Any solution for this problem is not cited in the disclosure. Although it is cited in the disclosure that various solid electrolyte membranes can be produced by the solution casting method, any specific method therefor is not cited. The method disclosed in the above-noted Publication No. 2004-131530 limits raw materials to be used and does not mention the usage of other materials having excellent properties.

According to the method disclosed in the above-noted Publication No. 2005-146018, it takes time to dry the casting membrane. In order to produce the membrane continuously, it is necessary to either (1) use a support having long length or (2) regulate running speed of the support slow. Option (1) makes the apparatus large in size, and option (2) lacks production efficiency. Therefore, this method is not preferable for the continuous membrane production. In the method of this publication, the coating layer containing (a), (b) and (c) was dried to remove (b) water-soluble compound. However, (b) generally has a high boiling point. Therefore, it is difficult to remove (b) by drying. The disclosure does not mention any solution for facilitating the removal of the organic solvent with high boiling point by drying.

It is an object of the present invention to provide a solid electrolyte membrane that has uniform quality and excellent proton conductivity continuously formed from a solid electrolyte, a method and an apparatus of producing the solid electrolyte membrane, and a membrane electrode assembly and a fuel cell using the solid electrolyte membrane.

DISCLOSURE OF INVENTION

In order to achieve the above and other objects, a method of producing a solid electrolyte membrane of the present invention includes the steps of (a), (b), (c), (d) and (e). The step (a) is to cast a dope containing a solid electrolyte and an organic solvent from a casting die onto a running support so as to form a casting membrane. The step (b) is to dry an exposed surface side of the casting membrane so as to form a skin layer as a part of the casting membrane at the exposed surface side after a lapse of 60 seconds from the casting. The skin layer has a surface tension different from that of the support side of the casting membrane. The step (c) is to peel the casting membrane from the support as a wet membrane containing the organic solvent. The step (d) is to dry the wet membrane so as to form the solid electrolyte membrane. The step (e) is to bring at least one of the casting membrane and the wet membrane before the step (d) into contact with a liquid having a boiling point lower than that of the organic solvent. The liquid is a poor solvent of the solid electrolyte.

The skin layer is formed by applying dry air with a velocity of less than 3 m/sec to the exposed surface of the casting membrane in the step (b).

The step (b) is performed in a chamber having at least one of a slit nozzle or a two-dimensional nozzle. The slit nozzle sends the dry air from a slit provided to face the exposed surface. The two-dimensional nozzle sends the dry air from a first opening and suctions air around the casting membrane into a second opening. The first and second openings of the two-dimensional nozzle are both provided to face the exposed surface.

A remaining solvent amount of the casting membrane is 150 wt. % or more and 500 wt. % or less on a dry basis at a time when the step (b) is started.

When the wet membrane before the step (d) is brought into contact with the liquid in the step (e), the step (d) is performed as a next step of the step (e).

When the casting membrane is brought into contact with the liquid in the step (e), a step (f) of drying the casting membrane is further performed after the step (e).

The step (e) is performed more than two times.

The step (e) is performed by soaking at least one of the casting membrane and the wet membrane before the step (d) in the liquid.

The organic solvent is a mixture of a poor solvent and a good solvent of the solid electrolyte.

A weight ratio of the poor solvent in the organic solvent is 10% or more and less than 100%.

The good solvent contains dimethylsulfoxide, whereas the poor solvent contains alcohol having 1 to 5 carbons.

The solid electrolyte is a hydrocarbon polymer.

The hydrocarbon polymer is an aromatic polymer having a sulfonic acid group.

The hydrocarbon polymer is a copolymer composed from each structure unit represented as formulae (I), (II) and (III) of a chemical formula 1:

[Chemical Formula 1]

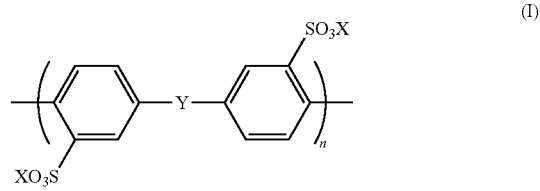

(I)

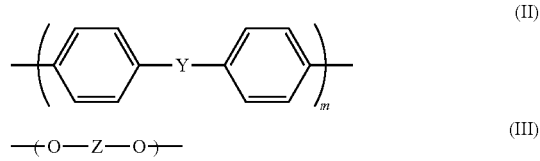

(II)

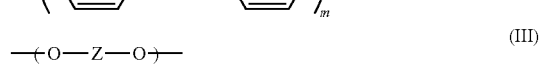

(III)

wherein, X is H or monovalent cationic species, Y is $SO_2$ and Z has a structure shown as a formula (I) or (II) of a chemical formula 2, and n and m satisfy the following condition: $0.1 \leq n/(m+n) \leq 0.5$.

[Chemical Formula 2]

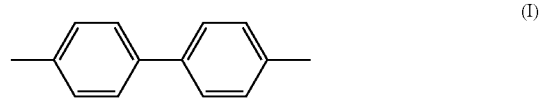

(I)

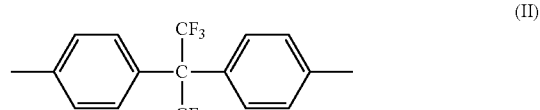

(II)

An apparatus of producing a solid electrolyte membrane of the present invention includes a casting device, a first drying device, a peeling device, a second drying device and a liquid contact device. The casting device casts a dope containing a solid electrolyte and an organic solvent from a casting die onto a running support so as to form a casting membrane. The first drying device dries an exposed surface side of the casting membrane so as to form a skin layer as a part of the casting membrane at the exposed surface side after a lapse of 60 seconds from the casting. The skin layer has a surface tension different from that of the support side of the casting membrane. The peeling device peels the casting membrane from the support as a wet membrane containing the organic solvent. The second drying device dries the wet membrane so as to form the solid electrolyte membrane. The liquid contact device brings at least one of the casting membrane and the wet membrane before the drying into contact with a liquid. The liquid has a boiling point lower than that of the organic solvent and is a poor solvent of the solid electrolyte.

A solid electrolyte membrane of the present invention is produced according to the above-mentioned method.

A membrane electrode assembly of the present invention includes the above-mentioned solid electrolyte membrane, an anode and a cathode. The anode is adhered to one surface of the solid electrolyte membrane, and generates protons from a hydrogen-containing material supplied from outside. The cathode is adhered to the other surface of the solid electrolyte membrane, and synthesizes water from the protons permeated through the solid electrolyte membrane and gas supplied from outside.

A fuel cell of the present invention includes the above-mentioned membrane electrode assembly and current collectors. One of the current collectors is provided in contact with the anode, and the other current collector is provided in contact with the cathode. The current collector on the anode side receives and passes electrons between the anode and outside, whereas the current collector on the cathode side receives and passes the electrons between the cathode and outside.

According to the present invention, it is possible to continuously produce the solid electrolyte membrane having uniform quality and excellent proton conductivity. Moreover, when the membrane electrode assembly using this solid electrolyte membrane is used for the fuel cell, the fuel cell realizes an excellent electromotive force. The method of producing the solid electrolyte membrane of the present invention includes the step (b) of drying the exposed surface side of the casting membrane so as to form the skin layer as a part of the casting membrane at the exposed surface side after a lapse of 60 seconds from the casting. The skin layer has a surface tension different from that of the support side of the casting membrane. Owing to this, the solid electrolyte membrane having excellent smoothness and planarity can be obtained. In addition, owing to the skin layer formed as a part of the casting membrane, the exposed surface side thereof possesses dense structure. The solid electrolyte membrane made of the casting membrane having this dense structure can control a crossover phenomenon when it is used for the fuel cell.

Moreover, owing to the step (e) of bringing at least one of the casting membrane and the wet membrane before the step (d) into contact with the liquid having a boiling point lower than that of the organic solvent, liquid substitution is performed between the liquid and the organic solvent remained in the casting membrane or the wet membrane. As a result, the organic solvent remained therein can be removed. In the present invention, the dry air is applied to the casting membrane to dry it, and the membrane with the remaining solvent less than a certain amount is soaked in the liquid that is the poor solvent of the solid electrolyte. Owing to this, it is possible to prevent micropores from forming at the time of soaking the membrane. Therefore, the problem of Japanese Patent Laid-Open Publication No. 2004-079378 can be solved. Moreover, the liquid used in the step (e) has the boiling point lower than that of the organic solvent. This makes it easier to remove the remained organic solvent in the wet membrane by drying in the step (d) or in the casting membrane by drying in the step (f). That is, the present invention solves the problem pointed out in Japanese Patent Laid-Open Publication No. 2005-146018. As a method of removing basic substances, pretreatment by acid treatment like neutralization may be performed to substitute protons for bases. In the present invention, however, such pretreatment is not necessary. By bringing the organic solvent into contact with the poor solvent of the solid electrolyte, and drying them, the organic solvent can be reliably removed along with the poor solvent from the membrane.

Furthermore, by performing the step (e) more than twice, the remained solvent can be further reliably removed from the casting membrane or the wet membrane. As a method of bringing the casting membrane or the wet membrane into contact with the liquid in the step (e), the casting membrane or the wet membrane is soaked in the liquid. Owing to this, it is possible to remove the organic solvent remained therein efficiently in a short time.

BRIEF DESCRIPTION OF DRAWINGS

FIG. 3 is a schematic diagram illustrating a first air blower and its surroundings, and FIG. 3A is an enlarged sectional view illustrating a casting membrane having a skin layer formed as a part thereof;

BEST MODE FOR CARRYING OUT THE INVENTION

Figure 1:
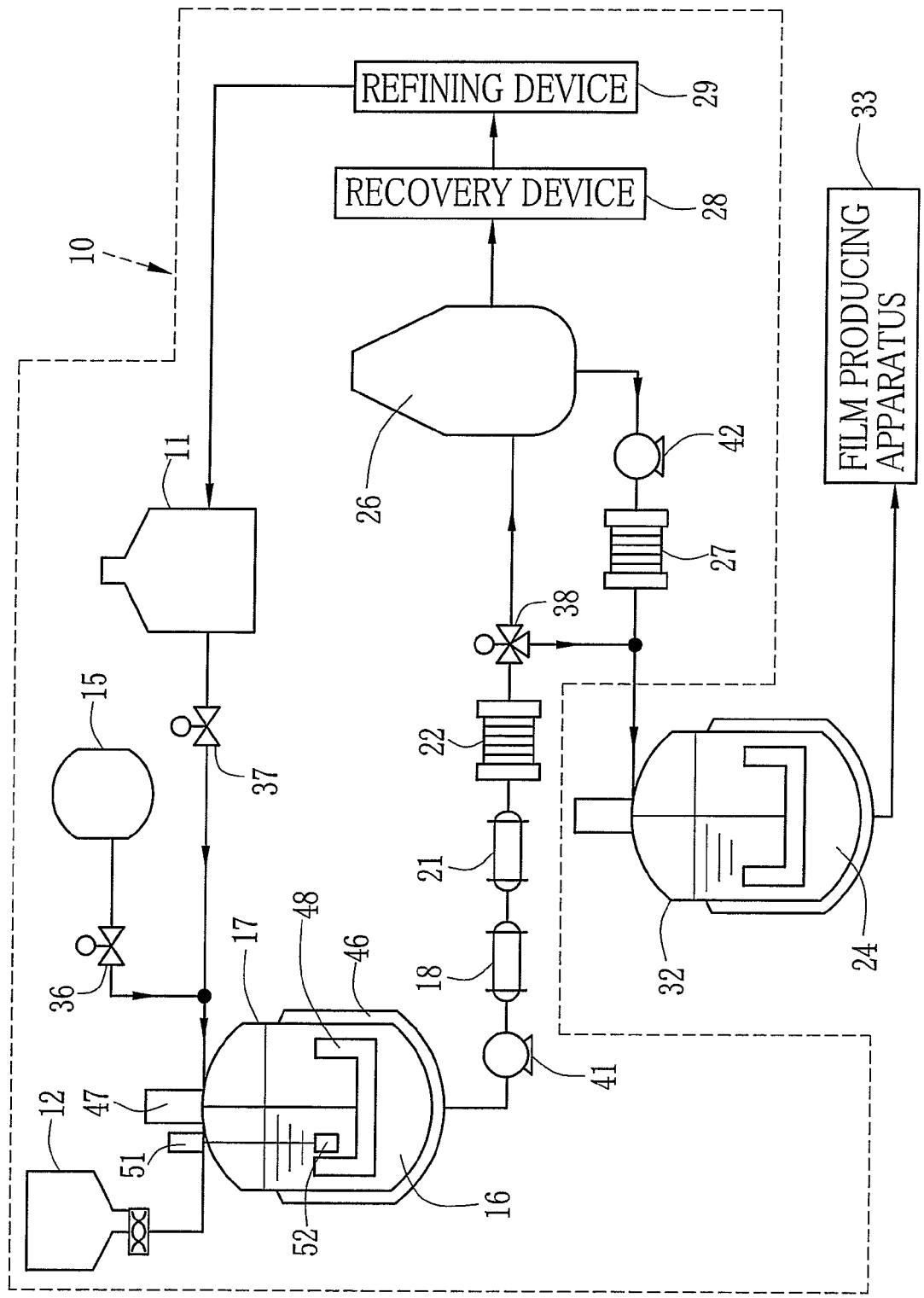
FIG. 1 is a schematic diagram illustrating a dope producing apparatus.

Embodiments of the present invention are described below in detail. The present invention, however, is not limited to the following embodiments. A solid electrolyte membrane of the present invention is first explained and followed by a producing method thereof.

[Material]

In the present invention, a polymer having a proton donating-group is used as a solid electrolyte, which is formed into a membrane by a producing method described later. The polymer having the proton donating-group is not particularly limited, but may be well-known proton conducting materials having an acid residue. For example, polymer compounds formed by addition polymerization having a sulfonic acid group in side chains, poly(meth)acrylate having a phosphoric acid group in side chains, sulfonated polyether etherketone, sulfonated polybenzimidazole, sulfonated polysulfone, sulfonated heat-resistant aromatic polymer compounds and the like are preferably used. As the polymer compounds formed by addition polymerization having a sulfonic acid group in side chains, there are perfluorosulfonic acid, as typified by Nafion (registered trademark), sulfonated polystyrene, sulfonated polyacrylonitrile styrene, sulfonated polyacrylonitrile butadiene-styrene and the like. As the sulfonated heat-resistant aromatic polymer compounds, there are sulfonated polyimide and the like.

Substances described in, for example, Japanese Patent Laid-Open Publication Nos. 4-366137, 6-231779 and 6-342665 are the preferable examples of the perfluorosulfonic acid, and the substance represented by the following chemical formula 3 is especially preferable above all. However, in the chemical formula 3, m is in the range of 100 to 10000, preferably in the range of 200 to 5000 and more preferably in the range of 500 to 2000. In addition, n is in the range of 0.5 to 100, and especially preferably in the range of 5 to 13.5. Moreover, x is nearly equal to m, and y is nearly equal to n.

[Chemical Formula 3]

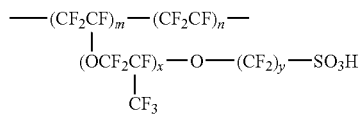

Compounds described in, for example, Japanese Patent Laid-Open Publication Nos. 5-174856 and 6-111834, or the substance represented by the following chemical formula 4 are the preferable examples of the sulfonated polystyrene, the sulfonated polyacrylonitrile styrene and the sulfonated polyacrylonitrile butadiene-styrene.

[Chemical Formula 4]

Substances described in, for example, Japanese Patent Laid-Open Publication Nos. 6-49302, 2004-10677, 2004-345997, 2005-15541, 2002-110174, 2003-100317, 2003-55457, 9-245818, 2003-257451 and 2002-105200, and International Publication No. WO97/42253 (corresponding to National Publication of Translated Version No. 2000-510511) are the examples of the sulfonated heat-resistant aromatic polymer compounds, and the substances represented by the above-noted chemical formula 1 and the following chemical formulae 5 and 6 are especially preferable above all.

Especially, a membrane made from the substance represented by the chemical formula 1 achieves a good balance between hygroscopic expansion coefficient and the proton conductivity. In the case of $n/(m+n)<0.1$, the number of the sulfonic acid group is too small to form a proton conducting path, which is so called a proton channel. As a result, the produced membrane may not have enough proton conductivity for actual use. In the case of $n/(m+n)>0.5$, the produced membrane has excessively high water absorption rate, which makes the produced membrane have a high expansion rate due to the absorption. As a result, the produced membrane may be easily deteriorated.

Sulfonation reaction on the process of obtaining the above-mentioned compounds can be performed in accordance with various synthetic methods described in the disclosed publications. Sulfuric acid (concentrated sulfuric acid), fuming sulfuric acid, gaseous or liquid sulfur trioxide, sulfur trioxide complex, amidosulfuric acid, chlorosulfonic acid and the like are used as sulfonating agents. Hydrocarbon (benzene, toluene, nitrobenzene, chlorobenzene, dioxetane and the like), alkyl halide (dichloromethane, chloroform, dichloroethane, tetrachloromethane and the like) and the like are used as a solvent. Reaction temperature in the sulfonation reaction is determined within the range of $-20°$ C. to $200°$ C. in accordance with the sulfonating agent activity. It is also possible to previously introduce a mercapto group, a disulfide group or a sulfinic acid group in a monomer, and synthesize the sulfonated compound by the oxidation reaction with an oxidant. In this case, hydrogen peroxide, nitric acid, bromine water, hypochlorite, hypobromite, potassium permanganate, chromic acid and the like are used as the oxidant. Water, acetic acid, propionic acid and the like are used as the solvent. The reaction temperature according to this method is determined within the range of a room temperature (for example, $25°$ C.) to $200°$ C. in accordance with the oxidant activity. It is also possible to previously introduce a halogeno-alkyl group in the monomer, and synthesize the sulfonated compound by the substitution reaction of sulfite, hydrogen sulfite and the like. In this case, water, alcohol, amide, sulfoxide, sulfone and the like are used as the solvent. The reaction temperature according to this method is determined within the range of the room temperature (for example, $25°$ C.) to $200°$ C. The solvent used for the above-mentioned sulfonation reactions can be a mixture of two or more substances.

In the reaction process to synthesize the sulfonated compound, an alkyl sulfonating agent can be used, and Friedel-Crafts reaction (Journal of Applied Polymer Science, Vol. 36, 1753-1767, 1988) using sulfone and $AlCl_3$ is a common

[Chemical Formula 5]

[Chemical Formula 6]

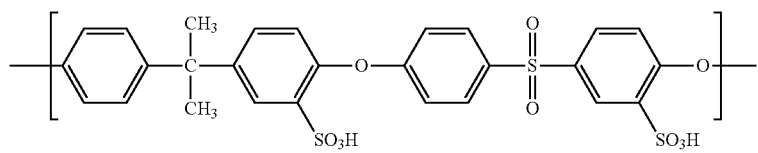

method. When using the alkyl sulfonating agent for the Friedel-Crafts reaction, hydrocarbon (benzene, toluene, nitrobenzene, acetophenone, chlorobenzene, trichlorobenzene and the like), alkyl halide (dichloromethane, chloroform, dichloroethane, tetrachloromethane, trichloroethane, tetrachloroethane and the like) and the like are used as the solvent. The reaction temperature is determined in the range of the room temperature to 200° C. The solvent used for the above-mentioned Friedel-Crafts reaction can be a mixture of two or more substances.

In order to produce the solid electrolyte membrane having the structure represented by the chemical formula 1, sulfonation may be performed during a membrane producing step, which is described later. That is, a dope containing a polymer (hereinafter, precursor) in which X in the chemical formula 1 is cationic species other than hydrogen atom (H) is first produced. The dope is cast on a support and is peeled as a membrane containing the precursor (hereinafter, precursor membrane). The precursor membrane is protonated to substitute H for the cationic species X, thereby producing the solid electrolyte membrane formed from the polymer having the structure of the chemical formula 1.

The cationic species is an atom or an atom group that generates a cation when ionizing. The cationic species is not necessarily univalent. Besides the proton, alkali metal cation, alkali earth metal cation and ammonium cation are preferable, and calcium ion, barium ion, quaternary ammonium ion, lithium ion, sodium ion and potassium ion are more preferable as the cation. Even if the substitution of H for the cationic species X in the chemical formula 1 is not performed, the produced membrane functions as the solid electrolyte. However, the proton conductivity of the membrane increases as the percentage of the substitution of H for the cationic species X increases. In view of this, X is especially preferably H.

The solid electrolyte preferably has the following properties. A proton conductivity is preferably not less than 0.005 S/cm, and more preferably not less than 0.01 S/cm at a temperature of 25° C. and at a relative humidity of 70%, for example. Moreover, after the solid electrolyte membrane has been soaked in a 50% methanol aqueous solution for a day at the temperature of 18° C., the proton conductivity is not less than 0.003 S/cm, and more preferably not less than 0.008 S/cm. At this time, it is particularly preferable that a percentage of reduction in the proton conductivity of the solid electrolyte as compared to that before the soaking is not more than 20%. Furthermore, a methanol diffusion coefficient is preferably not more than $4 \times 10^{-7}$ cm$^2$/sec, and especially preferably not more than $2 \times 10^{-7}$ cm$^2$/sec.

As to strength, the solid electrolyte membrane preferably has elastic modulus of not less than 10 MPa, and especially preferably of not less than 20 MPa. Note that the measuring method of the elastic modulus is described in detail in paragraph [0138] of Japanese Patent Laid-Open Publication No. 2005-104148. The above-noted values of the elastic modulus are obtained by a tensile tester (manufactured by Toyo Baldwin Co., Ltd.). In order to obtain the elastic modulus of the solid electrolyte membrane by other testing methods or testers, it is preferable to previously correlate the value thereof with that of the above-noted testing method and the tester.

As to durability, after a test with time in which the solid electrolyte membrane has been soaked into the 50% methanol aqueous solution at a constant temperature, a percentage of change in each of weight, ion exchange capacity and the methanol diffusion coefficient as compared to that before the soaking is preferably not more than 20%, and especially preferably not more than 15%. Moreover, in a test with time in hydrogen peroxide, the percentage of change in each of the weight, the ion exchange capacity and the methanol diffusion coefficient as compared to that before the soaking is preferably not more than 20%, and especially preferably not more than 10%. Furthermore, coefficient of volume expansion of the solid electrolyte membrane in the 50% methanol aqueous solution at a constant temperature is preferably not more than 10%, and especially preferably not more than 5%.

In addition, it is preferable that the solid electrolyte has stable ratios of water absorption and water content. It is also preferable that the solid electrolyte has extremely low solubility in alcohol, water or a mixture of alcohol and water to the extent that it is practically negligible. It is also preferable that weight reduction and shape change of the solid electrolyte membrane after it has been soaked in the above-mentioned liquid are small enough to be practically negligible.

The ionic conductivity property of the solid electrolyte membrane is represented by so-called index, which is a ratio of the ionic conductivity to methanol transmission coefficient. When the index is high in a particular direction, the ionic conductivity property in that direction is high. In thickness direction of the solid electrolyte membrane, the ionic conductivity is proportional to the thickness, while the methanol transmission coefficient is inversely proportional to the thickness. Therefore, the property of the ionic conductivity in the solid electrolyte membrane is controlled by changing the thickness thereof. The solid electrolyte membrane used for a fuel cell is provided with an anode on one surface and a cathode on the other surface thereof. Accordingly, it is preferable that the index is higher in the thickness direction of the membrane than that in other directions thereof. The thickness of the solid electrolyte membrane is preferably in the range of 10 μm to 30 μm. When, for example, the ionic conductivity and the methanol diffusion coefficient are both high in the solid electrolyte, it is especially preferable to produce the membrane with a thickness of 50 μm to 200 μm. When, for example, the ionic conductivity and the methanol diffusion coefficient are both low in the solid electrolyte, it is especially preferable to produce the membrane with the thickness of 20 μm to 100 μm.

Allowable temperature limit is preferably not less than 200° C., more preferably not less than 250° C., and especially preferably not less than 300° C. The allowable temperature limit here means the temperature at which reduction in weight of the solid electrolyte membrane reaches 5% as it is heated at a rate of 1° C./min. Note that the weight reduction is calculated with the exception of evaporated contents of water and the like.

When the solid electrolyte is formed in the membrane form and used for the fuel cell, the maximum power (output) density thereof is preferably not less than 10 mW/cm$^2$.

By use of the above-described solid electrolyte, it is possible to produce a solution dope preferable for the membrane production, and at the same time, it is possible to produce the solid electrolyte membrane preferable for the fuel cell. The solution preferable for the membrane production is, for example, a solution whose viscosity is relatively low, and from which foreign matters are easily removed through filtration. Note that the obtained solution is hereinafter referred to as the dope.

Any organic compound capable of dissolving the polymer as the solid electrolyte can be the solvent of the dope. For example, there are aromatic hydrocarbon (for example, benzene, toluene and the like), halogenated hydrocarbon (for example, dichloromethane, chlorobenzene and the like), alcohol (for example, methanol, ethanol, n-propanol, n-butanol, diethylene glycol and the like), ketone (for example, acetone, methylethyl ketone and the like), ester (for example, methylacetate, ethylacetate, propylacetate and the like), ether (for example, tetrahydrofuran, methyl cellosolve and the like), nitrogen compound (N-methylpyrrolidone (NMP), N,N-dimethylformamide (DMF), N,N'-dimethylacetamide (DMAc) and the like), dimethylsulfoxide (DMSO) and so forth.

The solvent of the dope may be a mixture of a plurality of the substances. When the solvent is the mixture, it is preferable to use a good solvent and a poor solvent of the solid electrolyte as the substances. When protonation is performed during the step of producing the solid electrolyte membrane having the structure represented by the chemical formula 1, it is preferable to use the mixture of the good solvent and the poor solvent of the precursor as the solvent. Whether the used substance is the good solvent or the poor solvent of the solid electrolyte can be distinguished by checking the presence of insoluble residues in a mixture of the solvent and the solid electrolyte. At this time, the solid electrolyte is mixed to have the weight of 5 wt. % of the total weight. The good solvent of the solid electrolyte in which the solid electrolyte is dissolved has a relatively high boiling point among the compounds commonly used as a solvent. On the other hand, the poor solvent of the solid electrolyte has a relatively low boiling point among the same. By mixing the poor solvent to the good solvent, the boiling point of the mixture in which the solid electrolyte is dissolved is lowered. Accordingly, it is possible to enhance efficiency and effectiveness of the solvent removal in the membrane producing step by mixing the poor and good solvents. This especially improves the efficiency in drying of the casting membrane.

In the mixture of the good and poor solvents, it is preferable that the poor solvent has as high weight percentage as possible. Particularly, it is preferable that the weight percentage of the poor solvent is not less than 10% and less than 100%. It is more preferable that (weight of the good solvent) (weight of the poor solvent) is 90:10 to 10:90. Owing to the high weight percentage of the poor solvent, the weight percentage of the low-boiling point component in the whole solvent becomes high, thereby further enhancing the drying efficiency and effectiveness in the membrane producing step of the solid electrolyte membrane.

As the good solvent components, DMF, DMAc, DMSO and NMP are preferable. Among these, the DMSO is most preferable from a safety standpoint and in view of its relatively low boiling point. As the poor solvent components, lower alcohol that has 1 or more and 5 or less carbons, methylacetate and acetone are preferable. Among these, the lower alcohol having 1 or more and 3 or less carbons is more preferable. When the DMSO is used as the good solvent component, methyl alcohol is especially preferable as the poor solvent component since it has best solubility in the DMSO.

In order to improve the various properties of the solid electrolyte membrane, it is possible to add additives to the dope. As the additives, there are antioxidants, fibers, fine particles, water absorbing agents, plasticizers and compatibilizing agents and the like. It is preferable that a concentration of these additives is in the range of not less than 1 wt. % and 30 wt. % or less when the entire solid contents of the dope is 100 wt. %. Note, however, that the concentration and the sorts of the additives have to be determined not to adversely affect on the proton conductivity. Hereinafter, the additives are explained in detail.

As the antioxidants, (hindered) phenol-type compounds, monovalent or divalent sulfur-type compounds, trivalent phosphorus-type compounds, benzophenone-type compounds, benzotriazole-type compounds, hindered amine-type compounds, cyanoacrylate-type compounds, salicylate-type compounds, oxalic acid anilide-type compounds are the preferable examples. The compounds described in Japanese Patent Laid-Open Publication Nos. 8-053614, 10-101873, 11-114430 and 2003-151346 are the specific examples thereof.

As the fibers, perfluorocarbon fibers, cellulose fibers, glass fibers, polyethylene fibers and the like are the preferable examples. The fibers described in Japanese Patent Laid-Open Publication Nos. 10-312815, 2000-231938, 2001-307545, 2003-317748, 2004-063430 and 2004-107461 are the specific examples thereof.

As the fine particles, titanium oxide, zirconium oxide and the like are the preferable examples. The fine particles described in Japanese Patent Laid-Open Publication Nos. 2003-178777 and 2004-217931 are the specific examples thereof.

As the water absorbing agents, that is, the hydrophilic materials, cross-linked polyacrylate salt, starch-acrylate salt, poval (polyvinyl alcohol), polyacrylonitrile, carboxymethyl cellulose, polyvinyl pyrrolidone, polyglycol dialkyl ether, polyglycol dialkyl ester, synthetic zeolite, titania gel, zirconia gel and yttria gel are the preferable examples. The water absorbing agents described in Japanese Patent Laid-Open Publication Nos. 7-135003, 8-020716 and 9-251857 are the specific examples thereof.

As the plasticizers, phosphoric acid ester-type compound, chlorinated paraffin, alkyl naphthalene-type compound, sulfone alkylamide-type compound, oligoether group, aromatic nitrile group are the preferable examples. The plasticizers described in Japanese Patent Laid-Open Publication Nos. 2003-288916 and 2003-317539 are the specific examples thereof.

As the compatibilizing agents, those having a boiling point or a sublimation point of not less than 250° C. are preferable, and those having the same of not less than 300° C. are more preferable.

The dope may contain various kinds of polymer compounds for the purpose of (1) enhancing the mechanical strength of the membrane, and (2) improving the acid concentration in the membrane.

For the purpose of (1), a polymer having a molecular weight in the range of 10000 to 1000000 or so and well compatible with (soluble to) the solid electrolyte is preferably used. For example, the polymer such as perfluorinated polymer, polystyrene, polyethylene glycol, polyoxetane, polyether ketone, polyether sulfone, and the polymer compound having the repeating unit of at least two of these polymers are preferable. Preferably, the polymer content of the membrane is in the range of 1 wt. % to 30 wt. % of the total weight. It is also possible to use the compatibilizing agent in order to enhance the compatibility of the polymer with the solid electrolyte. As the compatibilizing agent, those having the boiling point or the sublimation point of not less than 250° C. are preferable, and those having the same of not less than 300° C. are more preferable.

For the purpose of (2), proton acid segment-having polymer, and the like are preferably used. Perfluorosulfonic acid polymers such as Nafion (registered trademark), sulfonated polyether etherketone having a phosphoric acid group in side chains, and the sulfonated heat-resistant aromatic polymers such as sulfonated polyether sulfone, sulfonated polysulfone, sulfonated polybenzimidazole and the like are the preferable examples thereof. Preferably, the polymer content of the membrane is in the range of 1 wt. % to 30 wt. % of the total weight.

When the obtained solid electrolyte membrane is used for the fuel cell, an active metal catalyst that promotes the redox reaction of anode fuel and cathode fuel may be added to the dope. By adding the active metal catalyst, the fuel having penetrated into the solid electrolyte from one electrode is well consumed inside the solid electrolyte and does not reach the other electrode, and therefore this is effective for preventing a crossover phenomenon. The active metal catalyst is not particularly limited as long as it functions as an electrode catalyst, but platinum or platinum-based alloy is especially preferable.

[Dope Production]

In FIG. 1, a dope producing apparatus is shown. Note, however, that the present invention is not limited to the dope producing apparatus shown in FIG. 1. A dope producing apparatus 10 is provided with a solvent tank 11 for storing the solvent, a hopper 12 for supplying the solid electrolyte, an additive tank 15 for storing the additive, a mixing tank 17 for mixing the solvent, the solid electrolyte and the additive so as to make a mixture 16, a heater 18 for heating the mixture 16, a temperature controller 21 for controlling a temperature of the heated mixture 16, a filtration device 22 for filtering the mixture 16 fed out of the temperature controller 21, a flash device 26 for controlling a concentration of a dope 24 from the filtration device 22, and a filtration device 27 for filtering the concentration-controlled dope 24. The dope producing apparatus 10 is further provided with a recovery device 28 for recovering the solvent, and a refining device 29 for refining the recovered solvent. The dope producing apparatus 10 is connected to a membrane producing apparatus 33 through a stock tank 32. Note that the dope producing apparatus is also provided with valves 36, 37 and 38 for controlling amount of feeding, and feeding pumps 41 and 42. The number and the position of the valves and feeding pumps are changed as appropriate.

First of all, the valve 37 is opened to feed the solvent from the solvent tank 11 to the mixing tank 17. Successively, the solid electrolyte stored in the hopper 12 is sent to the mixing tank 17. At this time, the solid electrolyte may be continuously sent by a feeding device that performs measuring and sending continuously, or may be intermittently sent by a feeding device that measures a predetermined amount of the solid electrolyte first and sends the solid electrolyte of that amount. In addition, an additive solution is sent by a necessary amount from the additive tank 15 to the mixing tank 17 by adjusting the degree of opening of the valve 36.

In the case where the additive is liquid at room temperature, it is possible to send the additive in a liquid state to the mixing tank 17 instead of sending it as solution. Meanwhile, in the case where the additive is solid, it is possible to send the additive to the mixing tank 17 by using the hopper and so forth. When plural kinds of additives are added, the additive tank 15 may contain a solution in which the plural kinds of the additives are dissolved. Alternatively, many additive tanks may be used for respectively containing a solution in which one kind of the additive is dissolved. In this case, the additive solutions are respectively sent to the mixing tank 17 through an independent pipe.

In the above description, the solvent, the solid electrolyte and the additive are sent to the mixing tank 17 in this order. However, this order is not exclusive. For example, the solvent of an appropriate amount may be sent after the solid electrolyte has been sent to the mixing tank 17. By the way, the additive is not necessarily contained in the mixing tank 17 beforehand. The additive may be mixed in a mixture of the solid electrolyte and the solvent during a succeeding process by an in-line mixing method and so forth.

It is preferable that the mixing tank 17 is provided with a jacket for covering an outer surface thereof, a first stirrer 48 rotated by a motor 47, and a second stirrer 52 rotated by a motor 51. A temperature of the mixing tank 17 is regulated by a heat transfer medium flowing inside the jacket. A preferable temperature range of the mixing tank 17 is $-10°$ C. to $55°$ C. The first stirrer 48 and the second stirrer 52 are properly selected and used to swell the solid electrolyte in the solvent so that the mixture 16 is obtained. Preferably, the first stirrer 48 has an anchor blade and the second stirrer 52 is a decentering stirrer of dissolver type.

Next, the mixture 16 is sent to the heater 18 by the pump 41. It is preferable that the heater 18 is piping with a jacket (not shown) for letting a heat transfer medium flow between the piping and the jacket. It is further preferable that the heater 18 has a pressure portion (not shown) for pressurizing the mixture 16. By using this kind of the heater 18, solid contents of the mixture 16 are effectively and efficiently dissolved into the solvent under a heating condition or a pressurizing/heating condition. Hereinafter, the method of dissolving the solid contents into the solvent by heating is referred to as a heat-dissolving method. In this case, it is preferable that the mixture 16 is heated to have the temperature of $60°$ C. to $250°$ C.

Instead of the heat-dissolving method, it is possible to perform a cool-dissolving method in order to dissolve the solid contents into the solvent. The cool-dissolving method is a method to promote the dissolution while maintaining the temperature of the mixture 16 or cooling the mixture 16 to have lower temperatures. In the cool-dissolving method, it is preferable that the mixture 16 is cooled to $-100°$ C. to $-10°$ C. The above-mentioned heat-dissolving method and the cool-dissolving method make it possible to sufficiently dissolve the solid electrolyte in the solvent.

After the mixture 16 has reached about a room temperature by means of the temperature controller 21, the mixture 16 is filtered by the filtration device 22 to remove foreign matter like impurities or aggregations contained therein. The filtered mixture 16 is the dope 24. It is preferable that a filter used for the filtration device 22 has an average pore diameter of 50 μm or less.

The dope 24 after the filtration is sent to and pooled in the stock tank 32, and used for producing the membrane.

By the way, the method of swelling the solid contents once and dissolving it to produce the solution as described above takes a longer time as a concentration of the solid electrolyte in the solution increases, and it causes a problem concerning production efficiency. In view of this, it is preferable that the dope is prepared to have a lower concentration relative to an intended concentration, and a concentration process is performed to obtain the intended concentration after preparing the dope. For example, the dope 24 filtered by the filtration device 22 is sent to the flash device 26 by the valve 38, and the solvent of the dope 24 is partially evaporated in the flash device 26 to be concentrated. The concentrated dope 24 is extracted from the flash device 26 by the pump 42 and sent to the filtration device 27. At the time of filtration by the filtration device 27, it is preferable that a temperature of the dope 24 is $0°$ C. to $200°$ C. After removing foreign matter by the filtration device 27, the dope 24 is sent to and pooled in the stock tank 32, and used for producing the membrane. Note that the concentrated dope 24 may contain bubbles. It is therefore preferable that a defoaming process is performed before sending the dope 24 to the filtration device 27. As the method for removing the bubbles, various well-known methods are applicable. For example, there is an ultrasonic irradiation method in which the dope 24 is irradiated with an ultrasonic.

Solvent vapor generated due to the evaporation in the flash device 26 is condensed by the recovery device 28 having a condenser (not shown) and becomes a liquid to be recovered. The recovered solvent is refined by the refining device 29 as the solvent to be reused for preparing the dope. Such recovering and reusing are advantageous in terms of production cost, and also prevent adverse effects on human bodies and the environment in a closed system.

By the above method, the dope 24 having the solid electrolyte concentration of 5 wt. % or more and 50 wt. % or less is produced. It is more preferable that the solid electrolyte concentration is 10 wt. % or more and 40 wt. % or less. Meanwhile, as to a concentration of the additive, it is preferable that a range thereof is 1 wt. % or more and 30 wt. % or less when the entire solid contents of the dope is defined as 100 wt. %.

[Membrane Production]

Figure 2:
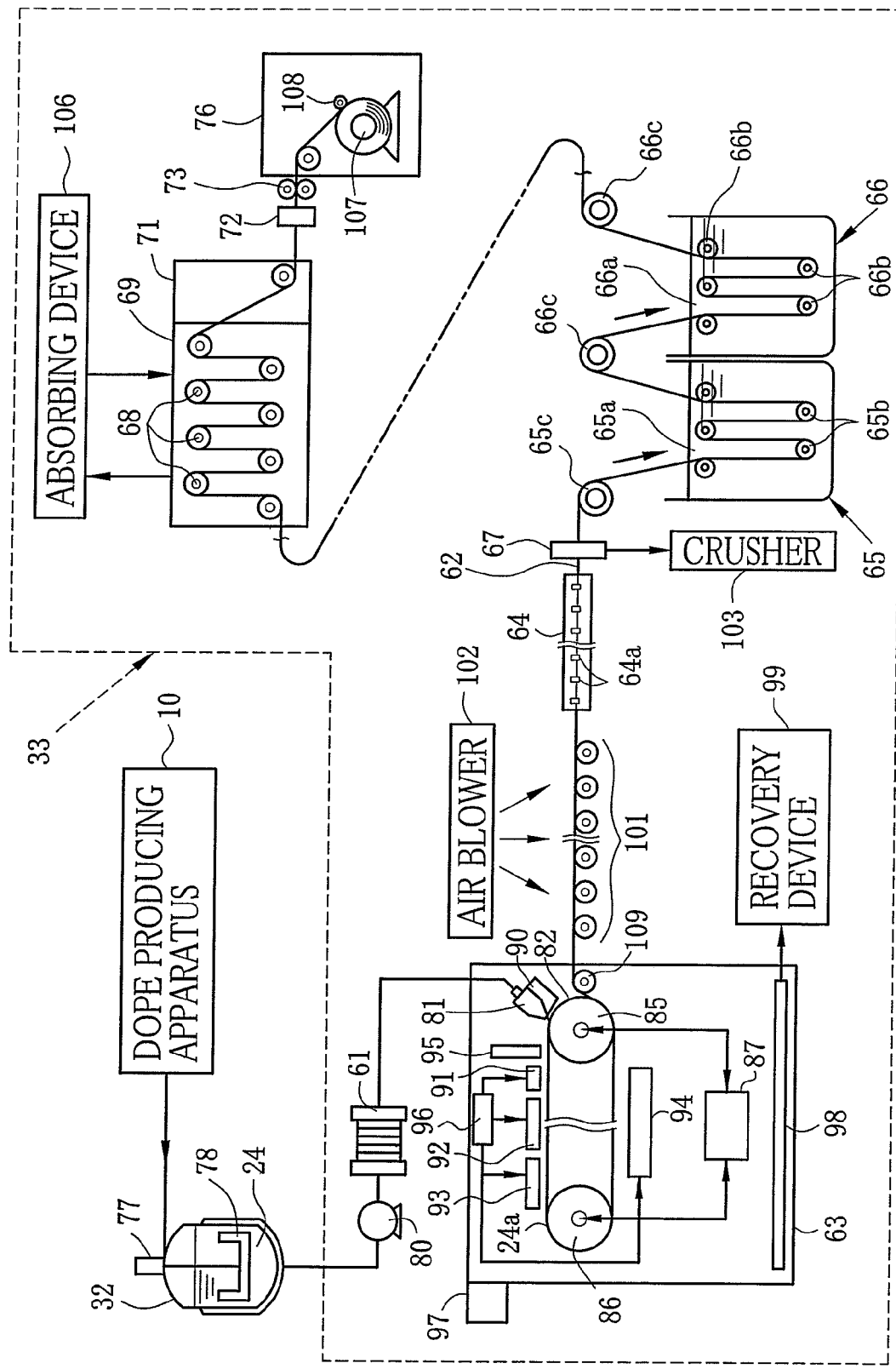
FIG. 2 is a schematic diagram illustrating a membrane producing apparatus according to a first embodiment.

Hereinafter, a method of producing the solid electrolyte membrane is explained. In FIG. 2, the membrane producing apparatus 33 as a first embodiment is shown. Note, however, that the present invention is not limited to the membrane producing apparatus shown in FIG. 2. The membrane producing apparatus 33 is provided with a filtration device 61 for removing foreign matter contained in the dope 24 sent from the stock tank 32, a casting chamber 63 for casting the dope 24 filtered by the filtration device 61 to form a solid electrolyte membrane (hereinafter, merely referred to as the membrane) 62, a tenter drier 64 for drying the membrane 62 in a state that both side edges thereof are held by clips, an edge slitting device 67 for cutting off both side edges of the membrane 62, a first liquid bath 65 and a second liquid bath 66 (liquid contact devices) in which the membrane 62 is soaked in a liquid, a drying chamber 69 for drying the membrane 62 while transporting it in a state that the membrane 62 is bridged across plural rollers 68, a cooling chamber 71 for cooling the membrane 62, a neutralization device 72 for reducing a charged voltage of the membrane 62, a knurling roller pair 73 for performing emboss processing on both side edges of the membrane 62, and a winding device 76 for winding up the membrane 62.

The stock tank 32 is provided with a stirrer 78 rotated by a motor 77. By the rotation of the stirrer 78, deposition or aggregation of the solid contents in the dope 24 is inhibited. The stock tank 32 is connected to the filtration device 61 through a pump 80. It is preferable that a filter used for the filtration device 61 has an average pore diameter of 10 μm or less. With this configuration, impurities which may cause deterioration in primary performance of the proton conductivity and time degradation of the proton conductivity are prevented from mixed into the membrane 62. The presence or absence of the impurities like insoluble substances can be evaluated by observing the dope 24 taken as a sample from the stock tank 32 under fluorescent lights.

A casting die 81 for casting the dope 24, and a belt 82 as a running support are provided in the casting chamber 63. As a material of the casting die 81, precipitation hardened stainless steel is preferable and it is preferable that a coefficient of thermal expansion thereof is $2 \times 10^{-5}$ (° C.$^{-1}$) or less. It is preferable that the material has anti-corrosion properties, which is substantially equivalent with SUS316 on a compulsory corrosion examination performed in an electrolyte aqueous solution. Further, it is preferable that the material has anti-corrosion properties in which pitting is not caused at a gas-liquid interface after soaked in a mixed liquid of dichloromethane, methanol and water for three months. Moreover, it is preferable to make the casting die 81 by grinding a material after at least one month has passed from foundry. In virtue of this, the dope 24 uniformly flows inside the casting die 81 and it is prevented that streaks are caused on a casting membrane 24a described later. As to finishing accuracy of a dope contact surface of the casting die 81, it is preferable that surface roughness is 1 μm or less and straightness is 1 μm/m or less in any direction. Slit clearance of the casting die 81 is adapted to be automatically adjusted within the range of 0.5 mm to 3.5 mm. With respect to a corner portion of a lip edge of the casting die 81, a chamfered radius R thereof is adapted to be 50 μm or less in the entire width. Furthermore, it is preferable that the casting die 81 is a coat-hanger type die.

A width of the casting die 81 is not especially limited. However, it is preferable that the width thereof is 1.1 to 2.0 times a width of a membrane as a final product. Moreover, it is preferable that a temperature controller is attached to the casting die 81 to maintain a predetermined temperature of the dope 24 during membrane formation. Furthermore, it is preferable that heat bolts for adjusting a thickness are disposed in a width direction of the casting die 81 at predetermined intervals and the casting die 81 is provided with an automatic thickness adjusting mechanism utilizing the heat bolts. In this case, the heat bolt sets a profile and forms a membrane along a preset program in accordance with a liquid amount sent by the pump 80. In order to precisely control the sending amount of the dope 24, the pump 80 is preferably a high-accuracy gear pump. Furthermore, feedback control may be performed over the automatic thickness adjusting mechanism. In this case, a thickness gauge such as an infrared thickness gauge is disposed at the membrane producing apparatus 33, and the feedback control is performed along an adjustment program on the basis of a profile of the thickness gauge and a detecting result from the thickness gauge. It is preferable that the casting die 81 is capable of adjusting the slit clearance of the lip edge to be ±50 μm or less so as to regulate a thickness difference between any two points, which are located within an area excepting an edge portion, of the membrane 62 as the final product to be 1 μm or less.

Preferably, a hardened layer is formed on the lip edge of the casting die 81. A method for forming the hardened layer is not especially limited. There are ceramic coating, hard chrome-plating, nitriding treatment method and so forth. When the ceramic is utilized as the hardened layer, it is preferable that the ceramic has grindable properties, low porosity, strength, excellent resistance to corrosion, and no affinity and no adhesiveness to the dope 24. Concretely, there are tungsten carbide (WC), $Al_2O_3$, TiN, $Cr_2O_3$ and so forth. Among these, the WC is especially preferable. It is possible to perform WC coating by a thermal spraying method.

It is preferable that a solvent supplying device (not shown) is attached near the lip edge of the casting die 81 in order to prevent the dope from being partially dried and solidified at the lip edge. It is preferable to supply a solvent to a peripheral portion of three-phase contact lines formed by both end portions of a casting bead, both end portions of the lip edge, and ambient air. It is preferable to supply the solvent to each side of the end portions at a rate of 0.1 mL/min to 1.0 mL/min. Owing to this, foreign matter such as the solid contents separated out from the dope 24, or extraneous matter mixed into the casting bead from outside can be prevented from entering into the casting membrane 24a. As a pump for supplying the solvent, it is preferable to use the one having a pulsation rate of 5% or less.

The belt 82 under the casting die 81 is supported by the rollers 85 and 86. The belt 82 is continuously transported by the rotation of at least one of these rollers 85 and 86.

A width of the belt 82 is not especially limited. However, it is preferable that the width of the belt 82 is 1.1 to 2.0 times the casting width of the dope 24. Preferably, a length of the belt 82 is 20 m to 200 m, and a thickness thereof is 0.5 mm to 2.5 mm. It is preferable that the belt 82 is ground so as to have surface roughness of 0.05 µm or less.

A material of the belt 82 is not especially limited, but preferably used a plastic film not soluble to the organic solvent in the dope. As a material of the belt 82, there are nonwoven plastic films such as polyethylene terephthalate (PET) film, polybutylene terephthalate (PBT) film, nylon 6 film, nylon 6,6 film, polypropylene film, polycarbonate film, polyimide film and the like. It is preferable to use lengthy material having enough chemical stability for the used solvent and enough heat resistance to the membrane forming temperature. Note that it is also possible to use a lengthy support made of stainless steel.

It is preferable that a heat transfer medium circulator 87, which supplies a heat medium to the rollers 85 and 86 so as to control surface temperatures thereof, is attached to the rollers 85 and 86. For this configuration, a surface temperature of the belt 82 is kept at a predetermined value. In this embodiment, a passage (not shown) for the heat transfer medium is formed in the respective rollers 85 and 86. The heat transfer medium maintained at a predetermined temperature passes through the inside of the passage to keep a temperature of the respective rollers 85 and 86 at a predetermined value. The surface temperature of the belt 82 is appropriately set in accordance with a kind of the solvent, a kind of the solid contents, a concentration of the dope 24 and the like.

Instead of the rollers 85 and 86, and the belt 82, it is also possible to use a casting drum (not shown) as the support. In this case, it is preferable that the casting drum is capable of accurately rotating with rotational speed unevenness of 0.2% or less. Moreover, it is preferable that the casting drum has average surface roughness of 0.01 µm or less. The surface of the casting drum is hard chrome plated so as to have sufficient hardness and durability. Furthermore, it is preferable to minimize surface defect of the casting drum, belt 82, and rollers 85 and 86. Concretely, it is preferable that there is no pinhole of 30 µm or more, and a number of the pinholes of 10 µm or more and less than 30 µm is at most one per square meter, and a number of the pinholes of less than 10 µm is at most two per square meter.

It is preferable to dispose a decompression chamber 90 for controlling a pressure of the casting bead, which is formed between the casting die 81 and the belt 82, at its upstream side in the running direction of the belt 82.

In the running direction of the belt 82, a first blower unit 91 is provided at a downstream side of the casting die 81 along the belt 82. At a downstream side of the first blower unit 91, second, third and fourth blower units 92, 93 and 94 are disposed in this order. As shown in FIG. 2, a dry-air circulating section 96 having an air blower and a heater is connected to the first to fourth blower units 91 to 94. The dry-air circulating section 96 supplies dry air to the first to fourth blower units 91 to 94. The first to fourth blower units 91 to 94 send the dry air toward a surface (hereinafter, exposed surface) 24b of the casting membrane 24a, which is opposite to the surface in contact with the belt 82. For this configuration, the dry air flows near the casting membrane 24a and thereby evaporating the organic solvent contained in the casting membrane 24a. Owing to this evaporation, the casting membrane 24a expresses a self-supporting property.

As shown in FIG. 3, between the casting die 81 and the first blower unit 91, an air shielding plate 95 extending in a width direction of the belt 82 is substantially vertically provided. At the bottom of the air shielding plate 95, labyrinth seals 95a are disposed. The labyrinth seals 95a prevent air occurred along with the running of the belt 82, that is, accompanying air (hereinafter, natural air), from flowing back. Owing to this, the dry air is not directly applied to the casting membrane 24a between the casting die 81 and the first blower unit 91. Hereinafter, the area between the casting die 81 and the first blower unit 91 is referred to as a natural air area 300.

The first blower unit 91 is formed with slit nozzles 91a each of which has a slit extending in the width direction of the belt 82. Owing to dry air 301 from the first blower unit 91, the exposed surface 24b of the casting membrane 24a is gradually dried. Accordingly, a skin layer 24c is formed as a part of the casting membrane 24a at the exposed surface 24b side, as shown in FIG. 3A. The skin layer 24c has a surface tension different from that of the belt 82 side of the casting membrane 24a. The skin layer 24c possesses dense structure.

Preferable velocity of the dry air 301 is less than 3 m/sec in approximately same direction as a transporting direction of the casting membrane 24a. When the dry air whose velocity exceeds 3 m/sec is applied to the exposed surface 24b, streaks or unevenness is formed thereon, and thus the membrane surface after the drying may not be smooth and even. Note that the velocity of the dry air 301 is a relative value to the transporting speed of the casting membrane 24a.

Preferable temperature of the dry air 301 is less than 100° C., and more preferably not less than 20° C. and 70° C. or less. If the casting membrane 24a absorbs water during this drying step, the casting membrane 24a may have phase separation and is solidified, and the produced membrane may have high porosity. Therefore, it is preferable that the dry air having low humidity is used for drying the casting membrane 24a right after the casting. That is, preferable humidity of the dry air 301 is 50% RH or less, and more preferably 20% RH or less.

The natural air is weak air having a velocity of 2 m/sec or less and its flowing direction is not constant. When the roughly flowing natural air is applied to the exposed surface 24b of the casting membrane 24a right after the casting, unevenness in streaks along the natural air may be formed at the exposed surface 24b. Therefore, it is preferable to regulate the velocity of the natural air, distance between the air shielding plate 95 and the first blower unit 91, and time of the casting membrane 24a passing through the natural air area 300. It is preferable that the velocity of the natural air toward the casting membrane 24a is small. Specifically, preferable velocity is less than 1.0 m/sec, and especially preferably less than 0.5 m/sec. It is preferable that the distance between the air shielding plate 95 and the first blower unit 91 is short. Specifically, it is preferably 3000 mm or less, more preferably 2000 mm or less, and further preferably 1000 mm or less. It is preferable that the time taken for the casting membrane 24a passing through the natural air area 300 is short. Specifically, it is preferably 15 seconds or less, more preferably 10 seconds or less, and most preferably 7 seconds or less.

The second, third and fourth blower units 92, 93 and 94 enhance dryness of the casting membrane 24a having the skin layer 24c formed, so that the casting membrane 24a comes to have a self-supporting property. Each of the second to fourth blower units 92 to 94 also has nozzles approximately identical to those of the first blower unit 91. Note that the nozzles of each blower unit may be of any shape, but preferably in a shape of sending the dry air uniformly in a width direction of the casting membrane 24a. Preferable velocity of the dry air from the second to fourth blower units 92 to 94 is about less than 15 m/sec in approximately same direction as the transporting direction of the casting membrane 24a. Preferable temperature of the dry air is 150° C. or lower, and more preferably not less than 30° C. and 150° C. or less. Preferable humidity of the dry air is 50% RH or less.

The drying conditions of each blower unit 91 to 94 are not limited to those described above. The drying conditions may be determined in accordance with the ingredients of the dope being cast or the casting device used for the casting step, so as to form the skin layer 24c after a lapse of 60 seconds from the casting of the dope 24. In order to adjust the drying conditions to be desired, the numbers and the positions of the blower units may be changed besides adjusting the dry air temperature or solvent vapor concentration. Combinations of these adjustments make it possible to set the drying conditions appropriate for each embodiment of the casting step.

Instead of the slit nozzle 91a, a two-dimensional nozzle may be used. The two-dimensional nozzle has first and second openings facing the exposed surface 24b. The first opening sends the dry air toward the exposed surface 24b. The second opening suctions air around the casting membrane 24a. The number of the slit nozzle 91a or the two-dimensional nozzle is not limited to one, but may be two or more. Inside of the slit nozzle 91a or the two-dimensional nozzle may be provided with a fin for changing the direction of the dry air. Moreover, between each of the slit nozzles 91a or each of the two-dimensional nozzles, an exhaust opening having a form almost identical to that of each nozzle may be provided so as to exhaust the dry air sent from the slit nozzle 91a or the like and hit against the casting membrane 24a.

Figure 4A:
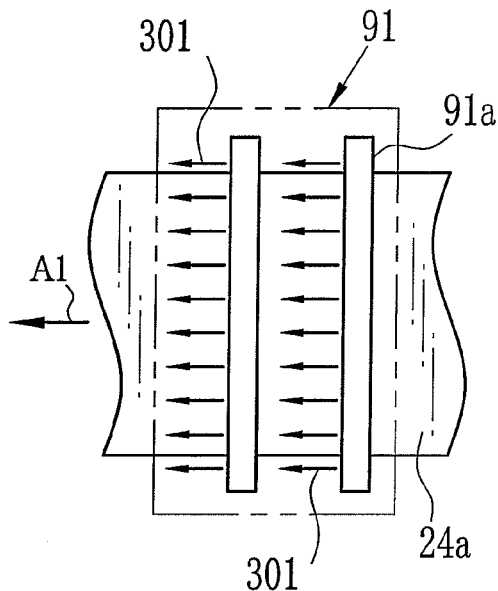
FIGS. 4A, 4B, 4C and 4D are illustrations showing dry-air applying manners by the first air blower according to various embodiments.
Figure 4B:
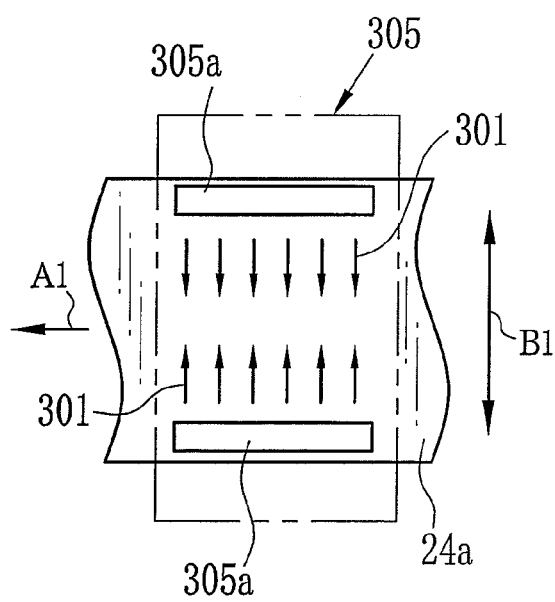
Figure 4C:
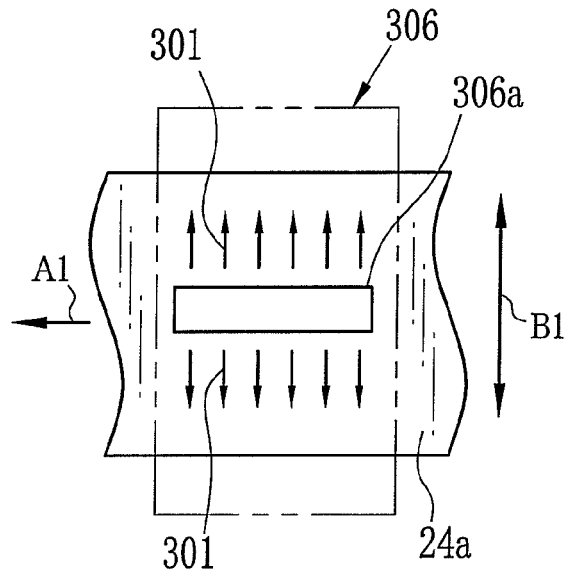
Figure 4D:
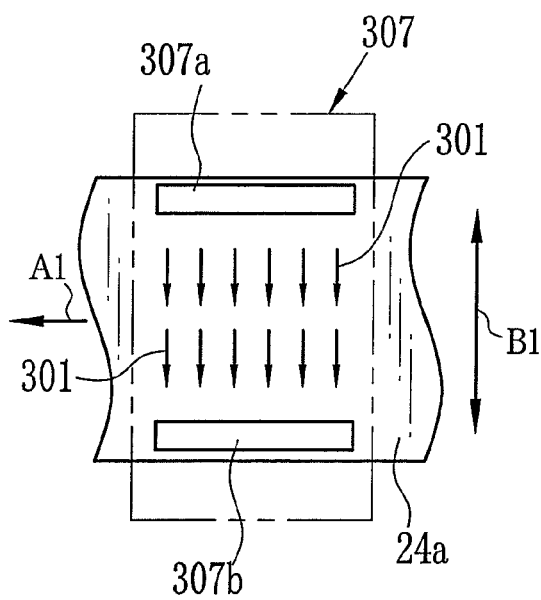

FIGS. 4A, 4B, 4C and 4D show flowing manners of the dry air from the first blower unit. As shown in FIG. 4A, the first blower unit 91 blows the forward dry air 301 in a running direction A1 of the belt 82. Besides the first blower unit 91, other blower units 305, 306 and 307 shown in FIGS. 4B, 4C and 4D, respectively are also useful as the first blower unit. The blower units 305 to 307 blow the dry air 301 along width directions B1 of the casting membrane 24a, which are the directions perpendicular to the running direction A1 of the belt 82. The blower unit 305 shown in FIG. 4B has nozzles 305a disposed near both sides of the casting membrane 24a. The nozzles 305a extend along the running direction A1. The blower unit 305 blows the dry air 301 from the nozzles 305a toward a central portion of the casting membrane 24a. In the blower unit 306 shown in FIG. 4C, a nozzle 306a is disposed near the center of the casting membrane 24a. The nozzle 306a extends along the running direction A1. The blower unit 306 blows the dry air 301 from the central portion toward both sides of the casting membrane 24a. In the blower unit 307 shown in FIG. 4D, a nozzle 307a is disposed near one side of the casting membrane 24a, whereas an exhaust opening 307b is disposed near the other side of the same. Both of the nozzle 307a and the exhaust opening 307b extend along the running direction A1. The blower unit 307 blows the dry air 301 such that the dry air 301 flows from the nozzle 307a toward the exhaust opening 307b The casting chamber 63 is provided with a temperature regulator 97 for maintaining an inside temperature thereof at a predetermined value, and a condenser 98 for condensing and recovering solvent vapor. A recovery device 99 for recovering the condensed and devolatilized organic solvent is disposed at the outside of the casting chamber 63.

After the casting membrane 24a has possessed a self-supporting property, the casting membrane 24a is peeled from the belt 82 as the membrane 62 while supported by a peeling roller 109. The membrane 62 is sent to a transfer section 101 disposed downstream of the casting chamber 63 by rollers.

In the solution casting method, various steps such as the drying step, the edge slitting step and so forth are performed over the membrane 62 after it is peeled from the support and until it is wound up as the final product. During or between each step, the membrane 62 is mainly supported or transported by the rollers. Among these rollers, some are drive rollers and others are non-drive rollers. The non-drive rollers are used for determining a membrane passage, and at the same time for improving transport stability of the membrane 62.

The transfer section 101 disposed downstream of the casting chamber 63 is provided with an air blower 102. The air blower 102 sends dry air to the membrane 62. After passing through the transfer section 101, the membrane 62 is sent to the tenter drier 64. In the tenter drier 64, both side edges of the membrane 62 are held with holding devices such as clips 64a or pins, and the membrane 62 is stretched in the width direction thereof. In addition, dry air is supplied inside the tenter drier 64 and thus the membrane 62 is dried. It is preferable that the inside of the tenter drier 64 is divided into temperature zones and drying conditions are properly adjusted in each zone. The membrane 62 fed out of the tenter drier 64 is then sent to the edge slitting device 67. The edge slitting device 67 is provided with a crusher 103 for shredding side edges cut from the membrane 62.

At a downstream side from the edge slitting device 67, the first liquid bath 65 and the second liquid bath 66 are disposed. The first liquid bath 65 is provided with guide rollers 65b and 65c. The second liquid bath 66 is provided with guide rollers 66b and 66c. The first liquid bath 65 stores a first liquid 65a, and the second liquid bath 66 stores a second liquid 66a.

As the first liquid 65a and the second liquid 66a, a liquid having a boiling point lower than that of the organic solvent, and is the poor solvent of the solid electrolyte is used. The liquid is preferably well compatible to the organic solvent. By using such liquid, the first and second liquids 65a and 66a are substituted for part of the solvent contained in the membrane 62, thereby reducing the remaining solvent amount of the membrane 62. Owing to this substitution, a boiling point of the solvent remained in the membrane 62 is lowered. In this way, it becomes easier to remove the remaining solvent of a precursor membrane in the later drying step.

As the first liquid 65a and the second liquid 66a, purified water is preferably used. However, it is also possible to use the first liquid 65a and the second liquid 66a made from two or more sorts of compounds. As examples of a mixture of two or more sorts of the compounds, there are an aqueous solution including organic compound with a low boiling point (alcohol and the like), and so forth. The purified water used in the present invention should have at least 1 MΩ or more of a specific electric resistance, and especially has less than 1 ppm of metal ion such as sodium ion, potassium ion, magnesium ion, calcium ion and the like, and less than 0.1 ppm of anion such as chlorine ion Cl⁻, nitrate ion $NO_3^-$ and the like. The purified water can be easily obtained by a reverse osmosis membrane, ion-exchange resin, distillation, or combination of these.

The liquid made to contact with the casting membrane 24a or the membrane 62 is different from the compounds as the solvent of the casting membrane 24a or the membrane 62. By bringing the casting membrane 24a or the membrane 62 into contact with the liquid, part of the solvent in the casting membrane 24a or the membrane 62 is substituted by this liquid. This phenomenon is referred to as liquid substitution. The liquid substitution becomes more active as temperatures of the first and second liquids 65a and 66a are higher. However, the rapid liquid substitution may cause wrinkles on the membrane 62. On the other hand, the liquid substitution takes longer time as the temperatures of the first and second liquids 65a and 66a are lower. In order to avoid the above problem, it is necessary to control a reaction speed of the liquid substitution.

Besides using the liquid made from two or more sorts of the above-noted compounds, the above problem can be avoided in the present invention by adjusting the temperatures of the first and second liquids 65a and 66a to be in the range of 10° C. to 80° C., respectively. It is more preferable that the temperatures of the first and second liquids 65a and 66a are regulated to be in the range of the 20° C. to 50° C., respectively.

The drying chamber 69 is provided with an absorbing device 106 to absorb and recover solvent vapor generated due to evaporation. In FIG. 2, the cooling chamber 71 is disposed downstream from the drying chamber 69. However, a humidity-controlling chamber (not shown) for controlling water content of the membrane 62 may be disposed between the drying chamber 69 and the cooling chamber 71. The neutralization device 72 is a forced neutralization device like a neutralization bar and the like, and capable of adjusting the charged voltage of the membrane 62 within a predetermined range (for example, −3 kV to +3 kV). Although the neutralization device 72 is disposed at the downstream side from the cooling device 71 in FIG. 2, this setting position is not exclusive. The knurling roller pair 73 forms knurling on both side edges of the membrane 62 by emboss processing. The winding device 76 is provided with a winding roller 107 for winding the membrane 62, and a press roller 108 for controlling tension at the time of winding.

Next, an embodiment of a method for producing the membrane 62 by using the above-described membrane producing apparatus 33 is described. The dope 24 is always uniformed by the rotation of the stirrer 78. Various additives may be mixed in the dope 24 during the stir.

The dope 24 is sent to the stock tank 32 by the pump 80, and deposition or aggregation of the solid contents in the dope 24 is inhibited by the stir. After that, the dope 24 is filtered by the filtration device 61 so as to remove the foreign matter having a size larger than a predetermined radius or foreign matter in a gel form.

The dope 24 is then cast from the casting die 81 onto the belt 82. In order to regulate the tension of the belt 82 to $10^3$ N/m to $10^6$ N/m, a relative position of the rollers 85 and 86, and a rotation speed of at least one of the rollers 85 and 86 are adjusted. Moreover, a relative speed difference between the belt 82 and the rollers 85 and 86 are adjusted so as to be 0.01 m/min or less. Preferably, speed fluctuation of the belt 82 is 0.5% or less, and meandering thereof caused in a width direction is 1.5 mm or less while the belt 82 makes one rotation. In order to control the meandering, it is preferable to provide a detector (not shown) for detecting the positions of both sides of the belt 82 and a position controller (not shown) for adjusting the position of the belt 82 according to detection data of the detector, and performs feed back control of the position of the belt 82. With respect to a portion of the belt 82 located just under the casting die 81, it is preferable that vertical positional fluctuation caused in association with the rotation of the roller 85 is adjusted so as to be 200 μm or less. Further, it is preferable that the temperature of the casting chamber 63 is adjusted within the range of −10° C. to 57° C. by the temperature regulator 97. Note that the solvent vaporized inside the casting chamber 63 is reused as dope preparing solvent after being collected by the recovery device 99.

The casting bead is formed between the casting die 81 and the belt 82, and the casting membrane 24a is formed on the belt 82. In order to stabilize a form of the casting bead, it is preferable that an upstream-side area from the bead is controlled by the decompression chamber 90 so as to be set to a desired pressure value. Preferably, the upstream-side area from the bead is decompressed within the range of −2500 Pa to −10 Pa relative to its downstream-side area from the casting bead. Incidentally, it is preferable that a jacket (not shown) is attached to the decompression chamber 90 to maintain the inside temperature at a predetermined temperature. Additionally, it is preferable to attach a suction unit (not shown) to an edge portion of the casting die 81 and suctions both sides of the bead in order to keep a desired shape of the casting bead. A preferable range of an air amount for aspirating the edge is 1 L/min to 100 L/min.

As shown in FIG. 3, the casting membrane 24a right after the casting passes through the natural air area 300 and then passes under the first blower unit 91. When the casting membrane 24a is passing under the first blower unit 91, the exposed surface 24b thereof is gradually dried by the dry air 301 from the first blower unit 91, thereby forming the skin layer 24c as a part of the casting membrane 24a at the exposed surface 24b side as shown in FIG. 3A. Owing to the formation of the skin layer 24c, the exposed surface 24b of the casting membrane 24a is smoothed, and its structure becomes dense. The solid electrolyte membrane for the fuel cell made of the casting membrane 24a having such skin layer 24c prevents molecules of fuel having large size (alcohol and the like) from passing through, and thus controls the crossover phenomenon. In addition, the solid electrolyte membrane having smooth surface has excellent adhesiveness to each electrode of the fuel cell. The fuel cell using such solid electrolyte membrane realizes excellent output density.

The skin layer 24c is formed after a lapse of 60 seconds from the casting of the dope 24. When the skin layer 24c is intended to be formed within 60 seconds from the casting, the dry air having a velocity of not less than 3 m/sec is necessary. However, application of the dry air with such a high velocity may form streaks or unevenness at the exposed surface 24b, and the surface of the membrane after the drying may not be smooth. The casting membrane 24a right after the casting especially tends to form streaks or unevenness. Note that a thickness of the skin layer 24c is preferably not less than 2% and 40% or less relative to the casting membrane 24 after the drying by the first blower unit 91.

In the case where a remaining solvent amount of the casting membrane 24a is less than 150 wt. % on a dry basis at a time when drying by the dry air 301 is started, the casting membrane 24a has been overdried. At this time, the skin layer 24c cannot be formed at the exposed surface 24b side. Meanwhile, in the case where a remaining solvent amount of the dope is more than 500 wt. %, the dope cannot be stably cast from the casting die 81. That is, the remaining solvent amount of the casting membrane 24a is preferably not less than 150 wt. % and 500 wt. % or less at a dry basis, and more preferably not less than 200 wt. % and 350 wt. % or less at a dry basis. The remaining solvent amount on a dry basis is a value calculated from the following formula: $[(x-y)/y] \times 100$, where x is a weight of the membrane at the time of sampling, and y is a weight of the same after drying up. The casting membrane 24a having the skin layer 24c at the exposed surface 24b side is dried by the dry air from the second, third and fourth blower units 92, 93 and 94 until the casting membrane 24a comes to have a self-supporting property.

As shown in FIG. 2, after the casting membrane 24a has possessed a self-supporting property, it is peeled from the belt 82 while supported by the peeling roller 109. The peeled membrane 62 containing the organic solvent is carried along the transfer section 101 provided with many rollers, and then fed into the tenter drier 64. In the transfer section 101, it is possible to give a draw tension to the membrane 62 by increasing a rotation speed of the downstream roller in comparison with that of the upstream roller. In the transfer section 101, dry air of a desired temperature is sent near the membrane 62, or directly blown to the membrane 62 from the air blower 102 to facilitate a drying process of the membrane 62. At this time, it is preferable that the temperature of the dry air is 20° C. to 250° C. A weight of the remaining solvent of the membrane 62 released from the peeling roller 109 is preferably not less than 10% and 150% or less relative to the weight of the solid electrolyte. The weight of the remaining solvent of the membrane 62 sent out of the transfer section 101 is preferably not less than 5% and 120% or less relative to the weight of the solid electrolyte.

The membrane 62 fed into the tenter drier 64 is dried while carried in a state that both side edges thereof are held with holding devices such as the clips 64a. It is preferable that the membrane 62 is stretched in the casting direction and/or the width direction in the transfer section 101 and/or the tenter drier 64 such that a size of the membrane 62 after the stretching becomes 100.5% to 300% of the size of the same before the stretching. Note that the weight of the remaining solvent of the membrane 62 fed out of the tenter drier 64 is preferably less than 20% relative to the weight of the solid electrolyte.

After the membrane 62 is dried by the tenter drier 64 until the remaining solvent amount thereof reaches a predetermined value, both side edges thereof are cut off by the edge slitting device 67. The cut edges are sent to the crusher 103 by a cutter blower (not shown). The membrane edges are shredded by the crusher 103 and become chips. The chip is recycled for preparing the dope, and this enables effective use of the raw material. The slitting process for the membrane edges may be omitted. However, it is preferable to perform the slitting process between the casting process and the membrane winding process.

The membrane 62 of which both side edges have been cut off is sent to the first liquid bath 65 and then to the second liquid bath 66 via the guide rollers 65c, 65b, 66c and 66b to be soaked in the first liquid 65a and then in the second liquid 66a. When the membrane 62 is soaked in the liquid 65a, part of the solvent of the membrane 62 is substituted by the first liquid 65a, thereby removing the part of the solvent in the membrane 62. As a result of the liquid substitution, the first liquid 65a is dissolved into the solvent in the membrane 62, and thus a first mixture liquid that is vaporized more easily than the solvent is generated. When the membrane 62 is soaked in the second liquid 66a, the solvent of the membrane 62 is substituted by the second liquid 66a, thereby further removing the solvent in the membrane 62. In the membrane 62, the second liquid 66a is dissolved into the first mixture liquid, and thus a second mixture liquid that is vaporized more easily than the first mixture liquid is generated.

In the first liquid bath 65 and the second liquid bath 66, the membrane 62 is brought into contact with the first liquid 65a and the second liquid 66a whose temperatures are kept at a predetermined value, respectively. Owing to this, rapid contraction of the membrane 62 due to the liquid substitution is controlled, and thus occurrence of wrinkles on the membrane 62 can be prevented. In view of speeding up the production of the solid electrolyte membrane, it is preferable that contact time of the membrane 62 with each first liquid 65a and second liquid 66a is made short as much as possible. Specifically, it is preferably within 30 minutes each, and more preferably within 10 minutes each.

As the first liquid 65a and the second liquid 66a, compounds different from each other may be used. For example, when a compound as the second liquid 66a has a lower boiling point than that of a compound as the first liquid 65a, the drying of the membrane 62 becomes easier. When the solvent is a mixture, the first and second liquids 65a and 66a should be the compounds that have high compatibility with the ingredient of the solvent least vaporizable in the later drying step. The ingredient least vaporizable may be the one has highest boiling point among the solvent ingredients, the one has largest content ratio among the solvent ingredients, or the like.

The membrane 62 sent out of the second liquid bath 66 is sent to the drying chamber 69. Inside of the drying chamber 69 is blown by dry air, and the membrane 62 is dried by the dry air while it is transported by the rollers. The weight of the remaining solvent of the membrane 62 fed out of the drying chamber 69 is preferably less than 5% relative to the weight of the solid electrolyte. In the drying chamber 69, therefore, the first and second mixture liquids containing the solvent is vaporized, and thereby removing the solvent from the membrane 62. Since the first mixture liquid containing the first liquid 65a, and the second mixture liquid containing the second liquid 66a each have the boiling point lower than that of the solvent, the membrane 62 can be dried more effectively and efficiently as compared to evaporating the solvent in the membrane 62 as it is. That is, the removal of the organic solvent in the membrane 62 is facilitated. Therefore, when the solid electrolyte membrane is used for a fuel cell, decrease of an electromotive force, which is caused by the proton passing inhibition due to the remaining organic solvent in the membrane 62, can be prevented. Moreover, the acid treatment like neutralization in order to completely remove the organic solvent is unnecessary, and thus the solid electrolyte membrane can be produced efficiently.

Although a temperature of the drying chamber 69 is not especially limited, it is determined in accordance with heat resistance properties (glass transition point Tg, heat deflection temperature under load, melting point Tm, continuous-use temperature and the like) of the solid electrolyte, and is preferably Tg or lower. Specifically, the inside temperature of the drying chamber 69 is preferably adjusted to be not less than 120° C. and 185° C. or less. The membrane 62 is preferably dried until the remaining solvent amount thereof reaches less than 5 wt. %. In the drying chamber 69, solvent vaporized from inside of the membrane 62 are suspended as the drying of the membrane 62 proceeds. In the present embodiment, the suspended solvent vapor is absorbed and recovered by the absorbing device 106. The air from which the solvent vapor is removed is sent again into the drying chamber 69 as the dry air.

Incidentally, it is preferable that the drying chamber 69 is divided into a plurality of regions for the purpose of changing the sending air temperature. Meanwhile, in a case that a preliminary drying chamber (not shown) is provided between the edge slitting device 67 and the drying chamber 69 to preliminarily dry the membrane 62, a membrane temperature is prevented from rapidly increasing in the drying chamber 69. Thus, in this case, it is possible to prevent a shape of the membrane 62 from changing. Instead of the drying by the dry air, or in addition to it, reduced-pressure drying, infrared ray drying, microwave drying and the like may be performed.

The membrane 62 fed out of the drying chamber 69 is cooled in the cooling chamber 71 until the membrane temperature becomes about a room temperature. In a case of providing a moisture control chamber (not shown) between the drying chamber 69 and the cooling chamber 71, air having desirable humidity and temperature is preferably applied to the membrane 62 in the moisture control chamber. It is preferable that the inside temperature of the moisture control chamber is regulated to be not less than 20° C. and 30° C. or less, and the humidity is regulated to be not less than 40% RH and 70% RH or less. By doing so, it is possible to prevent the membrane 62 from curling and to prevent winding defect from occurring at the time of winding.

While the membrane 62 is carried, the charged voltage thereof is kept in the predetermined range. The charged voltage is preferably at −3 kV to +3 kV after the neutralization. Moreover, it is preferable that the knurling is formed on the membrane 62 by the knurling roller pair 73. Incidentally, it is preferable that asperity height of the knurling portion is 1 μm to 200 μm.

The membrane 62 is wound up by the winding roller 107 contained in the winding device 76. At this time, it is preferable to wind the membrane 62 in a state that a desirable tension is given by the press roller 108. Preferably, the tension is gradually changed from the start of winding to the end thereof. Owing to this, the membrane 62 is prevented from being wound excessively tightly. It is preferable that a width of the membrane 62 to be wound up is at least 100 mm. The present invention is applicable to a case in that a thin membrane of which thickness is 5 μm or more and 300 μm or less is produced.

Figure 5:
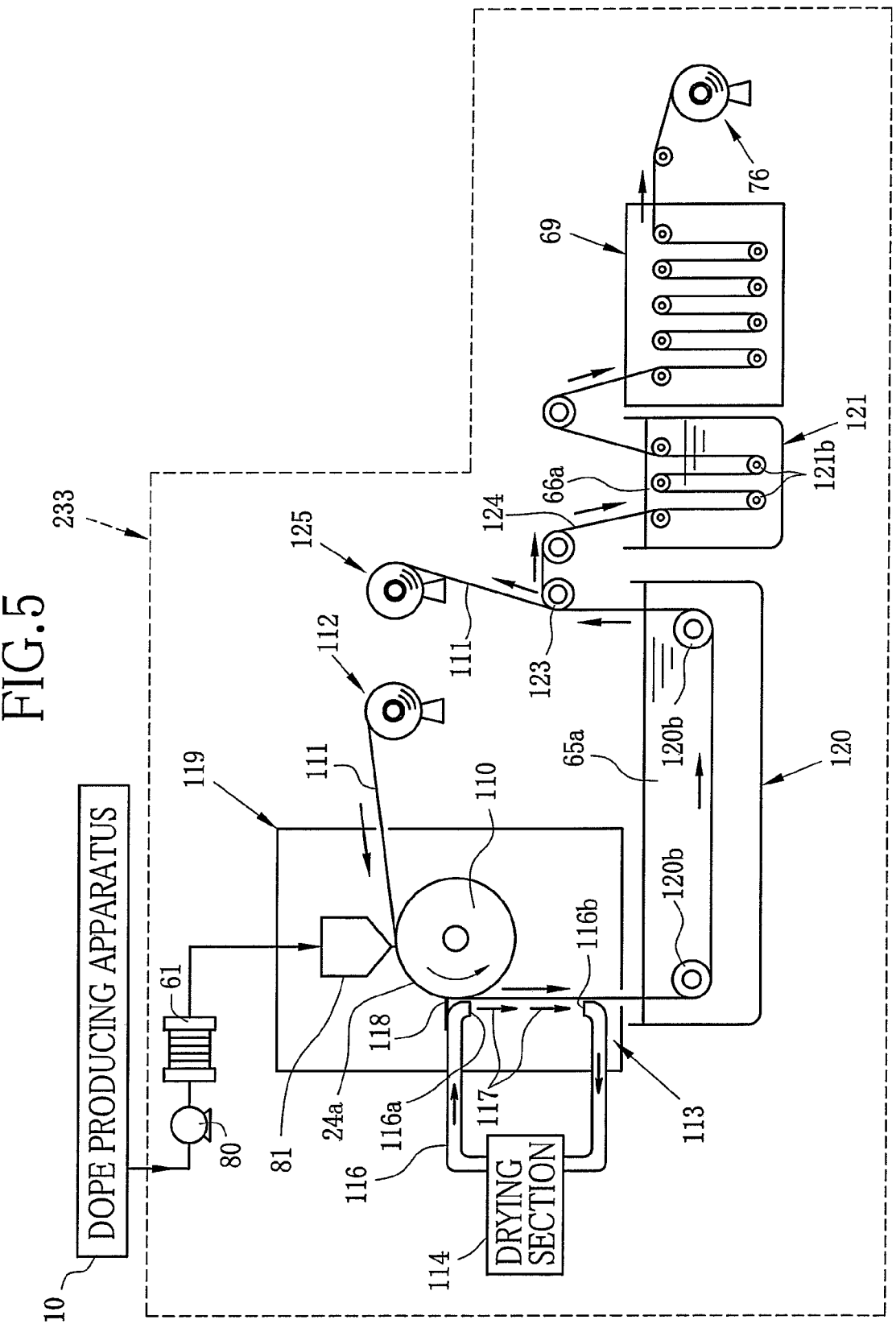
FIG. 5 is a schematic diagram illustrating the membrane producing apparatus according to a second embodiment.

Next, a membrane producing apparatus according to a second embodiment of the present invention is explained with referring to FIG. 5. As shown in FIG. 5, a membrane producing apparatus 233 as the second embodiment of the present invention has a plastic film (hereinafter, web) 111 as a casting support, instead of the belt 82 of the above-described membrane producing apparatus 33. In the membrane producing apparatus 233, the web 111 is wound around a transporting drum 110 and runs around it. The web 111 is loaded in a web-feeding device 112 in a roll form. From the web-feeding device 112, the web 111 is fed to the transporting drum 110. Above the transporting drum 110, the casting die 81 is set closely to the web 111. The dope 24 is cast from the casting die 81 onto the running web 111, and the casting membrane 24a is formed on a surface of the web 111. Note that the dope 24 and the casting die 81 are identical to those of the first embodiment, therefore they are assigned with same numerals and explanations thereof are omitted.

Along a running direction of the web 111, a casting membrane drying device 113 is provided. The casting membrane drying device 113 is constituted of a drying section 114. The drying section 114 is provided with a duct 116 having an air outlet 116a and an exhaust outlet 116b, an air blower, a heater, an external air feeding opening, and the like. The drying section 114 sends dry air 117 from the air outlet 116a in a manner that the dry air 117 is blown parallel to a running passage of the web 111, and also blown in the running direction of the web 111.

Preferable velocity of the dry air 117 is less than 3 m/sec in approximately same direction as the transporting direction of the casting membrane 24a. The velocity of the dry air 117 is a relative value to the transporting speed of the casting membrane 24a. Preferable temperature of the dry air 117 is not less than 10° C. and 140° C. or less, and more preferably not less than 20° C. and 70° C. or less. If the casting membrane 24a absorbs water during this drying step, the casting membrane 24a may have phase separation and is solidified, and the produced membrane may have high porosity. Therefore, it is preferable that the dry air having low humidity is used for drying the casting membrane 24a right after the casting. That is, preferable humidity of the dry air 117 is 50% RH or less, and more preferably 20% RH or less.

When the dry air 117 having such velocity is applied to the casting membrane 24a, the organic solvent contained in the casting membrane 24a is vaporized, thereby forming the skin surface 24c at the exposed surface 24b side of the casting membrane 24a after a lapse of 60 seconds from the casting.

When the casting membrane drying device 113 uses the dry air 117, an air shielding plate 118 is needed to be provided between the casting die 81 and the air outlet 116a. Owing to the air shielding plate 118, fluctuation of the surface condition of the casting membrane 24a due to the blowing of the dry air 117 is prevented. Thus, the membrane with less thickness unevenness can be obtained. The casting die 81, the transporting drum 110, the air outlet 116a and the exhaust outlet 116b of the casting membrane drying device 113, and the like are provided in a casting chamber 119.

When the predetermined amount of solvent is evaporating from the casting membrane 24a, in order to control the amount of solvent vapor in the casting chamber 119, the gases other than the solvent vapor in the casting chamber 119 should be recovered and kept at a predetermined amount. Instead of the above dry air supplying method, it is also possible to put a cover in the running passage of the web 111 from the casting die 81 to the first liquid bath 120 or to adjust an interval between the casting and the soaking in the first liquid bath 120. Moreover, it is also possible to adjust pressure of the solvent vapor, the pressure of gases other than the solvent vapor, temperature, air supplying velocity, air discharge velocity in this ambience. As the drying method, it is also possible to use infrared rays, decompression, far infrared rays and microwaves for drying instead of or in addition to the above dry air.

As the web 111, there are nonwoven plastic films such as PET film, PBT film, nylon 6 film, nylon 6,6 film, polypropylene film, polycarbonate film, polyimide film and the like. It is preferable that the plastic film to be used has enough chemical stability for the used solvent and enough heat resistance to the membrane forming temperature. In the present embodiment, the PET film is used as the web 111.

A surface temperature of the web 111 is appropriately determined in accordance with the material thereof, and is adjusted in the range of −20° C. to 100° C. In order to adjust the surface temperature of the web 111, a passage (not shown) for a heat transfer medium is provided in the transporting drum 110. The heat transfer medium maintained at a predetermined temperature passes through the inside of the passage, thereby adjusting the surface temperature. It is preferable that vertical positional fluctuation of the transporting drum 110 due to decentering thereof during the rotation is regulated to be 0.2 mm or less. Furthermore, it is preferable to minimize surface defect of the web 111. Concretely, it is preferable that there is no pinhole of 30 μm or more, and a number of the pinholes of 10 μm or more and less than 30 μm is at most one per square meter, and a number of the pinholes of less than 10 μm is at most two per square meter. A weight of the remaining solvent of a membrane 124 fed out of the casting chamber 119 is preferably not less than 10% and 250% or less relative to the weight of the solid electrolyte.

First and second liquid baths 120 and 121 have the same structures as those baths of the above-described first embodiment and store the first liquid 65a and the second liquid 65b, respectively. The casting membrane 24a soaked in and fed out of the first liquid bath 120 has a self-supporting property, and is peeled as the membrane 124 from the web 111 by a peeling roller 123 provided at an exit of the first liquid bath 120. The membrane 124 is then soaked in the second liquid bath 121 while guided by guide rollers 121b. Owing to the liquid substitution performed in the first liquid bath 120, the solvent in the casting membrane 24a can be reduced, and thus enhancing the membrane drying by the drying chamber 69 in the following step. Moreover, owing to the liquid substitution consecutively performed by soaking the membrane 124 in the second liquid bath 121, the membrane drying is further enhanced. The membrane 124 fed out of the second liquid bath 121 is dried in the drying chamber 69 and wound up by the winding device 76 into a roll form.

A remaining solvent amount of the membrane 124 at a time when it is peeled from the web 111 is preferably from 100 wt. % to 400 wt. % on a solid content basis. For pre-drying the casting membrane 24a before soaking in the second liquid bath 121, the tenter drier 64 or the drying chamber 69 of the first embodiment shown in FIG. 2 may be used. For example, the casting membrane 24a is dried with the web 111 in the tenter drier 64, and then dried in the drying chamber 69 while they are transported by the rollers. However, the present invention is not limited to the drying order described above. In addition, the position of the tenter drier 64 is not limited to the above embodiment. It is appropriately changed between, for example, the position where the membrane 124 is peeled from the support and the position where the membrane 124 is wound up.

The web 111 from which the membrane 124 is peeled is wound up in a roll form by a web-winding device 125. In order to continuously feed the web 111, it is preferable to use a web-feeding device and a web-winding device of turret type for the web-feeding device 112 and the web-winding device 125. In this second embodiment, merely guide rollers may be provided instead of the web-feeding and winding devices. In this case, the web 111 is configured to run endlessly. At the same time, a surface inspection machine is provided between the guide rollers to check the surface condition of the web 111. When the number or size of the pinholes exceeds the predetermined value on the web 111, new web 111 is supplied. In order to supply the new web 111, the old web 111 is first cut off. Then, the new web 111 is connected to one end of the old one. After the new web 111 takes one round, the old web 111 is disconnected, and both ends of the new web 111 are connected. In this way, the new web 111 is made endless. In order to prevent the membranes 124 from adhering to each other, and to protect a surface of the membrane 124, it is possible to keep the casting membrane 24a on the web 111 through the whole steps to be wound up at the end. In this case, the casting membrane 24a is peeled from the web 111 at the time of producing a fuel cell, as described later.

Figure 8:
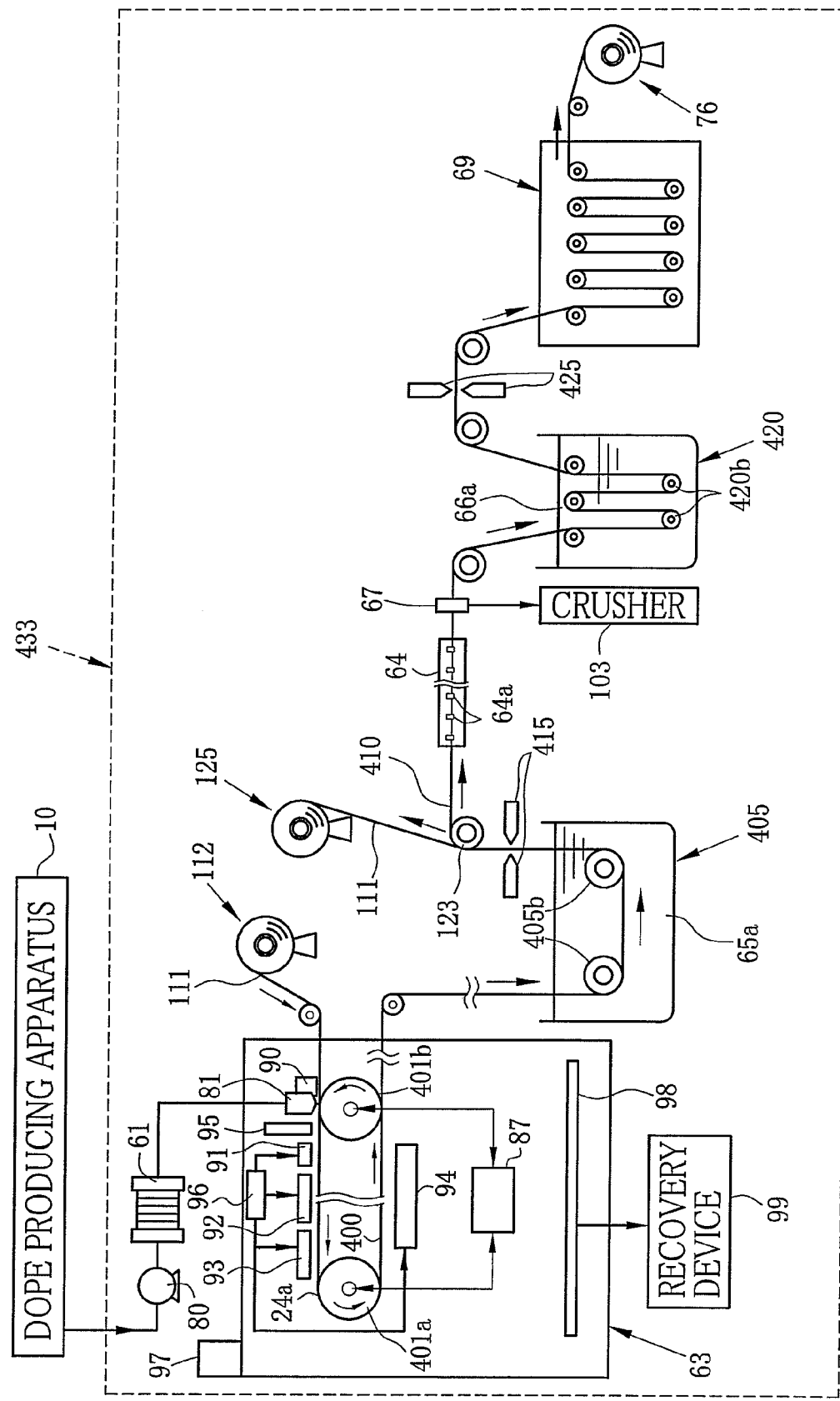
FIG. 8 is a schematic diagram illustrating the membrane producing apparatus according to a third embodiment.

Next, a third embodiment, which is most preferable in the present invention, is explained. FIG. 8 shows a membrane producing apparatus 433 as the third embodiment of the present invention. The membrane producing apparatus 433 has the web 111, instead of the belt 82 of the above-described membrane producing apparatus 33. In membrane producing apparatus 433, the method of producing solid electrolyte membrane in which the casting membrane 24a formed on the web 111 is soaked in the first liquid 65a and peeled as a membrane is performed. The components identical to those of the first embodiment shown in FIG. 2 or the second embodiment shown in FIG. 5 are assigned with same numerals and explanations thereof are omitted.

As in the same case of the second embodiment, the web 111 is loaded in the web-feeding device 112. In the casting chamber 63, a support belt 400 for supporting the web 111 is provided. The support belt 400 wound around and supported by drums 401a and 401b is a transporting passage on which the web 111 is transported in the casting chamber 64. After the web 111 is fed to the support belt 400 from the web-feeding device 112, it runs along the transporting passage in the casting chamber 63 and is guided to outside thereof. Instead of the support belt 400, it is also possible to use the transporting drum 110 to support the web 111.

The casting die 81 is disposed near the transporting passage in the casting chamber 63. The dope 24 is cast from the casting die 81 onto the running web 111, and the casting membrane 24a is formed on the surface of the web 111. Near the transporting passage at a downstream side of the casting die 81 is provided with the blower units 91, 92, 93 and 94, the air shielding plate 95 and the like in the same manner as the first embodiment.

While the web 111 is guided on the transporting passage, the blower units 91 to 94 apply the dry air 301 to the exposed surface 24b side of the casting membrane 24a on the web 111. As in the same case of the first embodiment (see FIG. 3A), the skin layer 24c is formed at the exposed surface 24b side of the casting membrane 24a after a lapse of 60 seconds from the casting owing to the dry air from the first blower unit 91. The blower units 92 to 94 gradually dry the casting membrane 24a having the skin layer 24c formed.

The casting membrane 24a dried until the remaining solvent amount thereof reaches a predetermined amount is guided out of the casting chamber 63 with the web 111. At a downstream side from the casting chamber 63, the web-winding device 125 is disposed. The web 111 guided by guide rollers is wound up by the web-winding device 125.

Between the casting chamber 63 and the web-winding device 125, guide rollers 405b are provided, and a first liquid bath 405 containing the first liquid 65a, a first water remover 415 and the peeling roller 123 are disposed in this order. The casting membrane 24a is fed out of the casting chamber 64 while guided by the web-winding device 125 and the guide rollers 405b. The casting membrane 24a is then brought into contact with the first liquid 65a while supported by the web 111, fed out therefrom, and guided to the first water remover 415.

The casting membrane 24a on the web 111 is drained by the first water remover 415. Blades, an air knife, rolls or the like is the specific example of the first water remover 415.

Among them, the air knife is preferable since it removes water most efficiently. The air knife makes it possible to remove water remained at the surface of the casting membrane 24a almost completely by adjusting volume and pressure of air blown toward the casting membrane 24a. However, if the air volume is too large, the casting membrane 24a may flap or gather and may not be transported stably. Therefore, the air volume is preferably in the range of 10 m/sec to 500 m/sec, more preferably in the range of 20 m/sec to 300 m/sec, and especially preferably in the range of 30 m/sec to 200 m/sec. The air volume is not specifically limited, but appropriately determined in accordance with amount of the water remained on the casting membrane 24a before draining, transporting speed of the casting membrane 24a, and the like.

In order to evenly remove the water on the casting membrane 24a, it is preferable to regulate a variation range in the airflow velocity in the width direction of the casting membrane 24a normally to be 10% or less, and preferably to be 5% or less by controlling an air outlet of the air knife or methods of supplying the air to the air knife. The closer the clearance between the surface of the transported casting membrane 24a and the air outlet of the air knife is, the more efficiently water is removed from the casting membrane 24a. However, the possibility of causing scratches on the surface of the casting membrane 24a due to contacting with the air outlet also increases as the clearance becomes closer. Therefore, it is necessary to keep certain clearance between them. Normally, the air knife is disposed such that the clearance between the air outlet thereof and the surface of the casting membrane 24a is 10 μm to 10 cm, preferably 100 μm to 5 cm, and more preferably 500 μm to 1 cm. Moreover, a backup roll is preferably provided to oppose the air knife across the support. For this configuration, a certain clearance between the air knife and the surface of the casting membrane 24a can be maintained, thereby reducing the flapping of the casting membrane 24a, occurrence of wrinkles or deformation of the casting membrane 24a, and the like.

After passing through the first water remover 415, the casting membrane 24a is guided to a peeling roller 123. The peeling roller 123 peels the casting membrane 24a from the web 111 as a membrane 410, and guides the membrane 410 to the tenter drier 64. In the tenter drier 64, the membrane 410 is dried until a remaining solvent amount thereof reaches a predetermined value. The membrane 410 passed through the tenter drier 410 is then sent to the edge slitting device 67.

The second liquid bath 420 storing the second liquid 66a is provided with guide rollers 420b. The membrane 410 of which both side edges have been cut off by the edge slitting device 67 is guided into the second liquid bath 420 while guided by the guide rollers 420b, soaked in the second liquid 66a and sent out of the second liquid 66a. By bringing the membrane 410 into contact with the second liquid 66a in this way, liquid substitution is performed. The membrane 410 fed out of the second liquid 66a is guided to a second water remover 425. The second water remover 425 has the same structure as the first water remover 410 and used for removing water from the membrane 410. After passing through the second water remover 410, the membrane 410 is guided to the drying chamber 69. Inside of the drying chamber 69 is blown by the dry air, and the membrane 410 is dried by the dry air while it is transported by the rollers. The liquid substitutions by the first and second liquids 65a and 66a as described above enable to reduce the time taken for drying the membrane 410 by the tenter drier 64 and the drying chamber 69, that is, the time taken for removing the organic solvent in the membrane 410. In addition, the time taken for drying the membrane 410 can be further reduced by removing water from the membrane 410 by the first and second water removers 415 and 425 after the liquid substitutions by the first and second liquids 65a and 66a are performed.

As described above, the casting membrane or the membrane is dried before the liquid substitution that is performed by bringing it into contact with the poor solvent of the solid electrolyte. In this way, the remaining solvent amount of the casting membrane or the membrane is made to be the predetermined amount or less by the drying. By performing the liquid substitution over such casting membrane or the membrane, occurrence of micropores during the liquid substitution can be controlled. Therefore, it is possible to obtain the solid electrolyte membrane having fewer defects.

In the chemical formula 1, when X is cationic species other than a hydrogen atom (H) in the polymer, that is, when the polymer is the precursor of the solid electrolyte, an acid treatment step may be performed in the above-described method of producing the solid electrolyte. In the acid treatment step, protonation is performed by bringing a solution containing acid, which is proton donor, and the precursor membrane into contact with each other. Owing to the protonation performed on the precursor membrane, the solid electrolyte is formed from the precursor in the precursor membrane. In this way, the solid electrolyte membrane is formed from the precursor membrane in the protonation. The protonation in the description is defined as a substitution of the hydrogen atom for the cationic species other than the hydrogen atom in the polymer.

In order to perform an efficient protonation over the precursor membrane in the acid treatment step, it is preferable that the remaining solvent amount of the precursor membrane is not less than 1 wt. % and 100 wt. % or less on a dry basis. When the drying is proceeded until the remaining solvent amount reaches less than 1 wt. %, the drying takes long time which is not preferable. When the acid treatment is performed over the precursor membrane whose solvent remaining amount is exceeding 100 wt. %, the membrane has high porosity which is not preferable.

After the acid treatment step, a washing step is preferably performed in order to get rid of the acid, which has not been used in the substitution of the hydrogen atom for the cationic species. The washing step also prevents the polymers and so forth composing the solid electrolyte membrane from contaminated by the acid.

As a method of washing the membrane after the acid treatment, the membrane is preferably soaked in water. However, the method is not limited to the soaking, but may be in any other ways as long as the acid is removed by bringing the membrane into contact with water. For example, there are ways to apply water to the solid electrolyte membrane, to spray water to the surface of the same, and so forth. The methods of applying or spraying water to the solid electrolyte membrane can be continually performed while the membrane is transported, and therefore the operations can be performed without lowering the productivity.

As the method for spraying water to the membrane, for instance, a method using an extrusion coater or various coating heads such as a fountain coater or a frog mouth coater is used. As the method using a spray nozzle which is commonly used for air humidification, spray painting, automatic cleaning of a tank and so forth is used. The coating methods are disclosed in "All about Coating", edited by Masayoshi Araki (published by Kako Gijutsu Kenkyukai (Converting Technical Institute, Ltd.), 1999), and the description thereof is also applicable to the present invention. Furthermore, in the case where the spray nozzle is used, it is possible to spray water across the entire width of the membrane by arranging a plurality of full cone spray nozzles or flat spray nozzles manufactured by H. IKEUCHI & CO., LTD. or Spraying Systems Co. along the width direction of the membrane.

The higher the velocity of spraying water is, the higher the turbulent mixing effect is obtained. However, such turbulent mixing effect may cause the reduction in the transportation stability of the membrane. For that reason, it is preferable to spray water at a velocity of 50 cm/sec to 1000 cm/sec, more preferably 100 cm/sec to 700 cm/sec, and most preferably 100 cm/sec to 500 cm/sec.

The amount of water to be used in washing should be larger than the calculated amount based on a theoretical dilution rate defined by an equation (1) below. The theoretical dilution rate is defined on the assumption that the whole amount of water for washing contributes to dilution of the contact solution containing the acid. Actually, the whole amount of water does not contribute to form a mixture, therefore a larger amount of water than that derived from the theoretical dilution rate is used in practice. The mount of water varies depending on the acid concentration of the solution used, additives, and types of the solvent, however, water is used in an amount providing a dilution rate of at least 100 to 1000 times, preferably 500 to 10000 times, more preferably 1000 to 100000 times. Note that in the equation (1) below, amount of each of water and aqueous acid solution is a liquid amount contacting the membrane per unit area.

$$\text{Theoretical dilution rate} = (\text{amount of water [ml/m}^2\text{]}) \div (\text{amount of aqueous acid solution [ml/m}^2\text{]}) \qquad (1)$$

When a certain amount of water is used in the washing method, it is preferable that the washing is performed in several times instead of performing it all at once. The washing effect can be improved as the number of washing increases.

However, when the washing is performed too many times, it may results in increases of equipment setting space and equipment expenses. In view of this, the number of washing is preferably 2 to 10 times (steps), but 2 to 5 steps of the washing are also sufficient to obtain preferable washing effect. In this case, it is preferable to secure an appropriate interval between each washing device by adjusting time of the washing or distance between each device so that water can be spread to dilute the solution containing the acid. It is further preferable that the solid electrolyte membrane is tilt while it is transported so that water on the membrane may flow over the surface thereof, and thereby the dilution of the solution containing the acid can be further enhanced. Most preferable method of washing is to provide a water remover between each washing device. As the water remover, those having the same structure as the above-described first water remover 415 or the second water remover 425 may be used.

The above-described acid treatment step and the washing step are performed at any timing as long as they are performed after the casting membrane is formed and before the membrane as the end product is obtained. For example, a first tank storing the solution containing the acid, and a second tank storing water are provided between the casting chamber and the tenter drier. The casting membrane, which has been dried to some extent, is sent to the first tank and to the second tank sequentially, thereby performing the acid treatment and the washing treatment. In this case, the casting membrane may be sent in each tank along with its support, or the membrane obtained by peeling from the support may be sent in each tank. The casting membrane or the membrane after the washing step is preferably drained by a water remover. As the water remover, those having the same structure as described above may be used, and it is not particularly restricted.

In the above embodiments, the casting membrane is peeled as the membrane after the contact with the first liquid, however the casting membrane may be peeled as the membrane during the contact with the first liquid. For example, the casting membrane is peeled as the membrane while it is soaked in the first liquid. In the above embodiments, the casting membrane is peeled by the drive peeling roller as the peeling device. However, the present invention is not limited to this, and the casting membrane may be peeled by other types of peeling devices. For example, the peeling device is disposed downstream of the peeling roller of non-drive type. The peeling device applies tension to the casting membrane in its transporting direction, thereby peeling the casting membrane. In the above embodiments, two liquid baths for substituting the organic solvent in the membrane are provided, however the number of the liquid bath may be at least one. In the above embodiments, two liquid baths are disposed next to each other, however other steps such as the drying of the membrane and the like may be performed between these baths. Besides soaking the membrane with the use of the liquid bath, the membrane may be brought into contact with the liquid in other ways such as by spraying, applying and so forth for the liquid substitution. By performing the liquid substitution for more than twice, the organic solvent can be further reliably removed from the membrane.

In the present invention, a simultaneous co-casting method or a sequential co-casting method can be performed to cast two or more sorts of dopes. When the simultaneous co-casting is performed, a feed block may be attached to the casting die, or a multi-manifold type casting die may be used. A thickness of at least one surface layer, which is exposed to outside, of a multi-layered membrane is preferably in the range of 0.5% to 30% to the total thickness of the membrane. Moreover, in the simultaneous co-casting method, it is preferable to preliminary adjust each dope's viscosity such that the lower viscosity dopes entirely cover over the higher viscosity dope when the dopes are cast onto the support from the die slit. Furthermore, in the simultaneous co-casting method, it is preferable that the inner dope is covered with dopes whose poor solvent ratio is larger than that of the inner dope in the bead, which is formed between the die and the support.

Instead of the above-described method for forming the solid electrolyte into a membrane, it is possible to infiltrate the solid electrolyte into micropores of a so-called porous substrate in order to produce different type of the solid electrolyte membrane. As such method of producing the solid electrolyte membrane, there are a method in which a sol-gel reaction liquid containing the solid electrolyte is applied to the porous substrate so that the sol-gel reaction liquid is infiltrated into the micropores thereof, a method in which such porous substrate is dipped in the sol-gel reaction liquid containing the solid electrolyte to thereby fill the micropores with the solid electrolyte, and the like. Preferred examples of the porous substrate are porous polypropylene, porous polytetrafluoroethylene, porous cross-linked heat-resistant polyethylene, porous polyimide, and the like. Additionally, it is also possible to process the solid electrolyte into a fiber form and fill spaces therein with other polymer compounds, and forms this fiber into a membrane to produce the solid electrolyte membrane. In this case, for example, those used as the additives in the present invention may be used as the polymer compounds to fill the spaces.

The solid electrolyte membrane of the present invention is appropriately used for the fuel cell, especially as a proton conducting membrane for a direct methanol fuel cell. Besides that, the solid electrolyte membrane of the present invention is used as a solid electrolyte membrane interposed between the two electrodes of the fuel cell. Moreover, the solid electrolyte membrane of the present invention is used as an electrolyte for various cells (redox flow cell, lithium cell, and the like), a display element, an electrochemical censor, a signal transfer medium, a condenser, an electrodialysis, an electrolyte membrane for electrolysis, a gel actuator, a salt electrolyte membrane, a proton-exchange resin, and the like.

(Fuel Cell)

Figure 6:
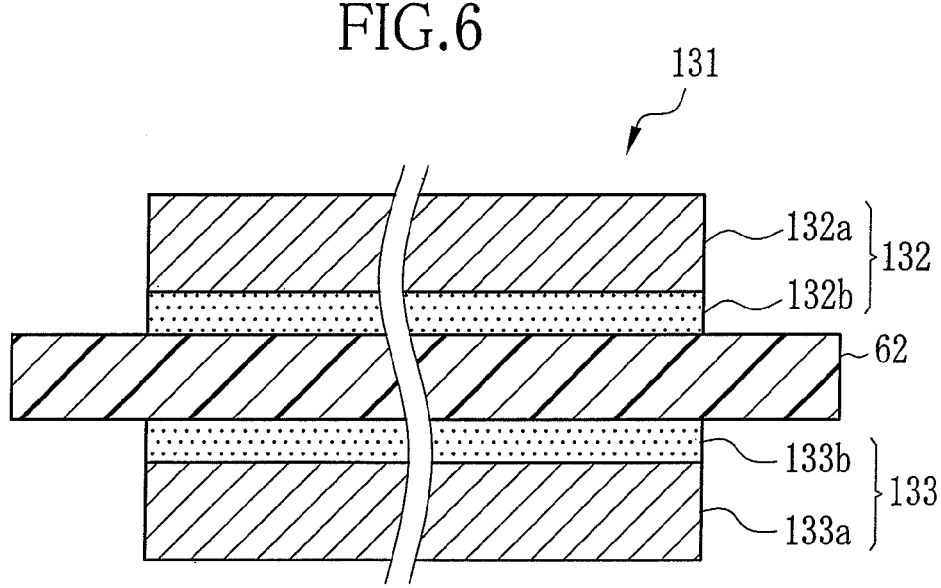
FIG. 6 is a sectional view illustrating a structure of a membrane electrode assembly that uses a solid electrolyte membrane of the present invention.

Hereinafter, an example of using the solid electrolyte membrane in a Membrane Electrode Assembly (hereinafter, MEA) and an example of using this MEA in a fuel cell are explained. Note, however, that forms of the MEA and the fuel cell described here are just an example and the present invention is not limited to them. In FIG. 6, a MEA 131 has the membrane 62 and an anode 132 and a cathode 133 opposing each other. The membrane 62 is interposed between the anode 132 and the cathode 133.

The anode 132 has a porous conductive sheet 132*a* and a catalyst layer 132*b* contacting the membrane 62, whereas the cathode 133 has a porous conductive sheet 133*a* and a catalyst layer 133*b* contacting the membrane 62. As the porous conductive sheets 132*a* and 133*a*, there are a carbon sheet and the like. The catalyst layers 132*b* and 133*b* are made of a dispersed substance in which catalyst metal-supporting carbon particles are dispersed in the proton conducting material. As the catalyst metal, there are platinum and the like. As the carbon particles, there are, for example, ketjenblack, acetylene black, carbon nanotube (CNT) and the like. As the proton conducting material, there are, for example, Nafion (registered trademark) and the like.

As a method of producing the MEA 131, the following four methods are preferable.

(1) Proton conducting material coating method: A catalyst paste (ink) that has an active metal-supporting carbon, a proton conducting material and a solvent is directly applied onto both surfaces of the membrane 62, and the porous conductive sheets 132a and 133a are (thermally) adhered under pressure thereto to form a five-layered MEA.

(2) Porous conductive sheet coating method: A liquid containing the materials of the catalyst layers 132b and 133b, that is, for example the catalyst paste is applied onto the porous conductive sheets 132a and 133a to form the catalyst layers 132b and 133b thereon, and the membrane 62 is adhered thereto under pressure to form a five-layered MEA.

(3) Decal method: The catalyst paste is applied onto polytetrafluoroethylene (PTFE) to form the catalyst layers 132b and 133b thereon, and the catalyst layers 132b and 133 alone are transferred to the membrane 62 to form a three-layer structure. The porous conductive sheets 132a and 133a are adhered thereto under pressure to form a five-layered MEA.

(4) Catalyst post-attachment method: Ink prepared by mixing a carbon material not supporting platinum and the proton conducting material is applied onto the membrane 62, the porous conductive sheet 132a and 133a or the PTFE to form a membrane. After that, the membrane is impregnated with liquid containing platinum ions, and platinum particles are precipitated in the membrane through reduction to thereby form the catalyst layers 132b and 133b. After the catalyst layers 132b and 133b are formed, the MEA 131 is formed according to one of the above-described methods (1) to (3).

(5) Other method: A coating liquid containing the materials of the catalyst layers 132b and 133b is previously prepared. The coating liquid is applied onto supports and dried. The supports having the catalyst layers 132b and 133b formed thereon are adhered so as to contact with both surfaces of the membrane 62 under pressure. After peeling the supports therefrom, the membrane 62 having the catalyst layers 132b and 133b on both surfaces is interposed by the porous conductive sheets 132a and 133a. In this way, the catalyst layers 132b and 133b are tightly adhered to the membrane 162, thereby forming a MEA.

Figure 7:
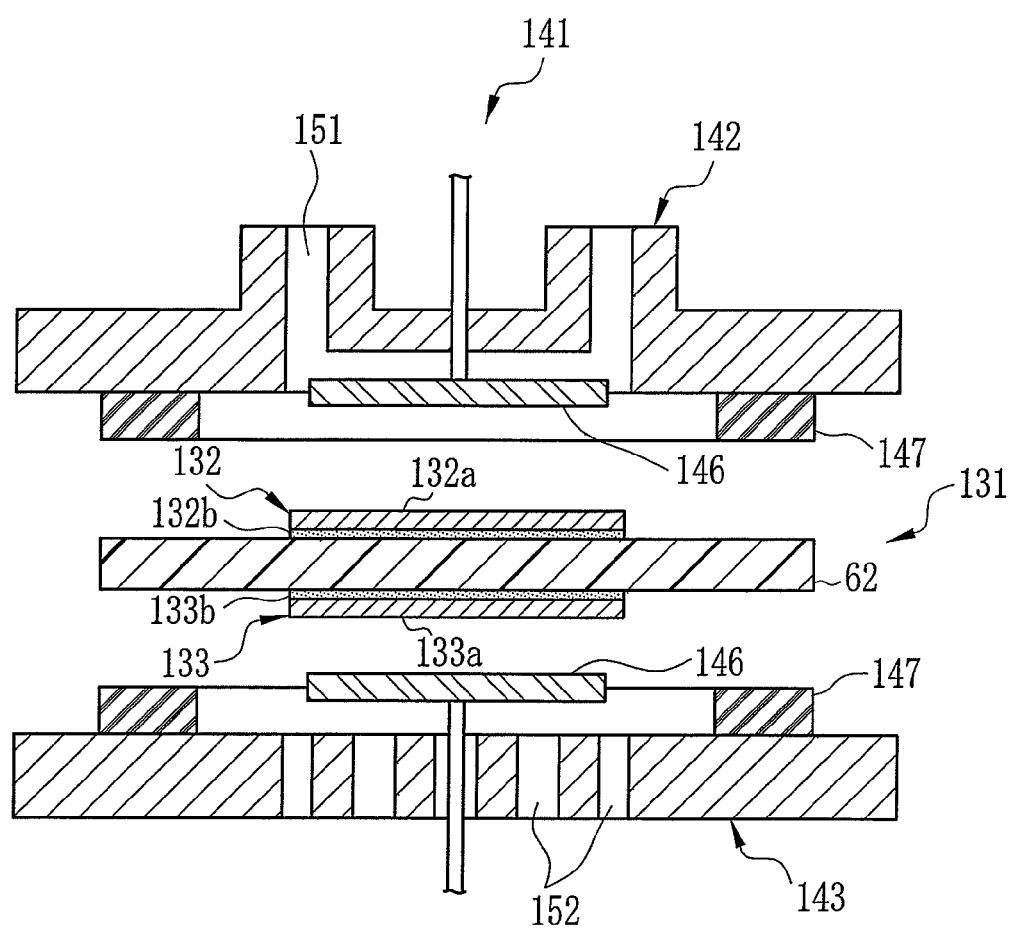
FIG. 7 is an exploded sectional view illustrating a structure of a fuel cell that uses the membrane electrode assembly of the present invention.

In FIG. 7, a fuel cell 141 has the MEA 131, a pair of separators 142, 143 holding the MEA 131 therebetween, current collectors 146 made of a stainless net attached to the separators 142, 143 and gaskets 147. The fuel cell 141 is illustrated in exploded fashion in FIG. 7 for the sake of convenience of explanation, however, each element of the fuel cell 141 are adhered to each other to be used as a fuel cell. The anode-side separator 142 has an anode-side opening 151 formed through it; and the cathode-side separator 143 has a cathode-side opening 152 formed through it. Vapor fuel such as hydrogen or alcohol (methanol and the like) or liquid fuel such as aqueous alcohol solution is fed to the cell via the anode-side opening 151; and an oxidizing gas such as oxygen gas or air is fed thereto via the cathode-side opening 152.

For the anode 132 and the cathode 133, for example, a catalyst that supports active metal particles of platinum or the like on a carbon material may be used. The particle size of the active metal particles that are generally used in the art is from 2 nm to 10 nm. Active metal particles having a smaller particle size may have a larger surface area per the unit weight thereof, and are therefore more advantageous since their activity is higher. If too small, however, the particles are difficult to disperse with no aggregation, and it is said that the lowermost limit of the particle size will be 2 nm or so.

In hydrogen-oxygen fuel cells, the active polarization of cathode, namely air electrode is higher than that of anode, namely hydrogen electrode. This is because the cathode reaction, namely oxygen reduction is slow as compared with the anode reaction. For enhancing the oxygen electrode activity, usable are various platinum-based binary alloys such as Pt—Cr, Pt—Ni, Pt—Co, Pt—Cu, Pt—Fe. In a direct methanol fuel cell in which aqueous methanol is used for the anode fuel, usable are platinum-based binary alloys such as Pt—Ru, Pt—Fe, Pt—Ni, Pt—Co, Pt—Mo, and platinum-based ternary alloys such as Pt—Ru—Mo, Pt—Ru—W, Pt—Ru—Co, Pt—Ru—Fe, Pt—Ru—Ni, Pt—Ru—Cu, Pt—Ru—Sn, Pt—Ru—Au in order to inhibit the catalyst Poisoning with CO that is formed during methanol oxidation. For the carbon material that supports the active metal thereon, preferred are acetylene black, Vulcan XC-72, ketjenblack, carbon nanohorn (CNH) and CNT.

The function of the catalyst layers 132b, 133b includes (1) transporting fuel to active metal, (2) providing the reaction site for oxidation of fuel (anode) or for reduction of fuel (cathode), (3) transmitting the electrons released in the redox reaction to the current collector 146, and (4) transporting the protons generated in the reaction to the solid electrolyte, namely the membrane 62. For (1), the catalyst layers 132b, 133b must be porous so that liquid and vapor fuel may penetrate into the depth thereof. The catalyst supporting active metal particles on a carbon material works for (2); and the carbon material works for (3). For attaining the function of (4), the catalyst layers 132b, 133b contain a proton conducting material added thereto. The proton conducting material to be in the catalyst layers 132b, 133b is not specifically defined as long as it is a solid that has a proton-donating group. The proton conducting material may preferably be acid residue-having polymer compounds that are used for the membrane 62 such as perfluorosulfonic acids, as typified by Nafion (registered trademark); poly(meth)acrylate having a phosphoric acid group in side chains; sulfonated heat-resistant aromatic polymers such as sulfonated polyether etherketones and sulfonated polybenzimidazoles. When the solid electrolyte for the membrane 62 is used for the catalyst layers 132b, 133b, the membrane 62 and the catalyst layers 132b, 133b are formed of a material of the same type. As a result, the electrochemical adhesiveness between the solid electrolyte and catalyst layer becomes high. Accordingly, this is advantageous in terms of the proton conductivity. The amount of the active metal to be used herein is preferably from 0.03 mg/cm$^2$ to 10 mg/cm$^2$ in view of the cell output and economic efficiency. The amount of the carbon material that supports the active metal is preferably from 1 to 10 times the weight of the active metal. The amount of the proton conducting material is preferably from 0.1 to 0.7 times the weight of the active metal-supporting carbon.

The anode 132 and the cathode 133 act as current collectors (power collectors) and also act to prevent water from staying therein to worsen vapor permeation. In general, carbon paper or carbon cloth may be used. If desired, the carbon paper or the carbon cloth may be processed with PTFE so as to be repellent to water.

The MEA has a value of area resistance preferably at 3 $\Omega$cm$^2$ or less, more preferably at 1 $\Omega$cm$^2$ or less, and most preferably at 0.5 $\Omega$cm$^2$ or less according to alternating-current (AC) impedance method in a state that the MEA is incorporated in a cell and the cell is filled with fuel. The area resistance value is calculated by a product of the measured resistance value and a sample area.

Fuel for fuel cells is described. For anode fuel, usable are hydrogen, alcohols (methanol, isopropanol, ethylene glycol and the like), ethers (dimethyl ether, dimethoxymethane, trimethoxymethane and the like), formic acid, boronhydride complexes, ascorbic acid, and so forth. For cathode fuel, usable are oxygen (including oxygen in air), hydrogen peroxide, and so forth.

In direct methanol fuel cells, the anode fuel may be aqueous methanol having a methanol concentration of 3 wt. % to 64 wt. %. As in the anode reaction formula ($CH_3OH + H_2O \rightarrow CO_2 + 6H^+ + 6e^-$), 1 mol of methanol requires 1 mol of water, and the methanol concentration at this time corresponds to 64 wt. %. A higher methanol concentration in fuel is more effective for reducing the weight and the volume of the cell including a fuel tank of the same energy capacity. However, if the methanol concentration is too high, much methanol may penetrate through the solid electrolyte to reach the cathode on which it reacts with oxygen to lower the voltage. This is so-called the crossover phenomenon. When the methanol concentration is too high, the crossover phenomenon is remarkable and the cell output tends to lower. In view of this, the optimum concentration of methanol shall be determined depending on the methanol perviousness through the solid electrolyte used. The cathode reaction formula in direct methanol fuel cells is $(3/2) O_2 + 6H^+ + 6e^- \rightarrow H_2O$, and oxygen (generally, oxygen in air) is used for the fuel in the cells.

For supplying the anode fuel and the cathode fuel to the respective catalyst layers 132b and 133b, there are two applicable methods: (1) a method of forcedly sending the fuel by the use of an auxiliary device such as pump (active method), and (2) a method not using such an auxiliary device, in which liquid fuel is supplied through capillarity or by spontaneously dropping it, and vapor fuel is supplied by exposing the catalyst layer to air (passive method). It is also possible to combine the methods (1) and (2). In the method (1), high-concentration methanol is usable as fuel, and air supply enables high output from the cells by extracting water formed in the cathode area. These are the advantages of the method (1). However, this method has the disadvantage in that the necessary fuel supply unit will make it difficult to downsize the cells. On the other hand, the advantage of the method (2) is capability of downsizing the cells, but the disadvantage thereof is that the fuel supply rate is readily limited and high output from the cells is often difficult.

Unit cell voltage of fuel cells is generally at most 1 V. Therefore, the unit cells are stacked up in series depending on the necessary voltage for load. For cell stacking, employable methods are a method of "plane stacking" that arranges the unit cells on a plane, and a method of "bipolar stacking" that stacks up the unit cells via a separator with a fuel pathway formed on both sides thereof. In the plane stacking, the cathode (air electrode) is on the surface of the stacked structure and therefore it readily takes air thereinto. In addition, since the stacked structure may be thinned, it is more favorable for small-sized fuel cells. Besides the above-described methods, MEMS technology may be employed, in which a silicon wafer is processed to form a micropattern and fuel cells are stacked thereon.

Fuel cells may have many applications for automobiles, electric and electronic appliances for household use, mobile devices, portable devices, and the like. In particular, direct methanol fuel cells can be downsized, the weight thereof can be reduced and do not require charging. Having such many advantages, they are expected to be used for various energy sources for mobile appliances and portable appliances. For example, mobile appliances in which fuel cells are favorably used include mobile phones, mobile notebook-size personal computers, electronic still cameras, PDA, video cameras, mobile game machines, mobile servers, wearable personal computers, mobile displays and the like. Portable appliances in which fuel cells are favorably used include portable generators, outdoor lighting devices, pocket lamps, electrically-powered (or assisted) bicycles and the like. In addition, fuel cells are also favorable for power sources for robots for industrial and household use and for other toys. Moreover, they are further usable as power sources for charging secondary batteries that are mounted on these appliances.

EXAMPLE 1

Hereinafter, examples of the present invention are explained. In the following description, Example 1 is explained in detail. With respect to Examples 2 to 8, conditions different from the Example 1 are only explained. Note that Examples 1, 2, 5 to 8 are examples of the embodiments of the present invention. The most preferable embodiment is Examples 7 and 8. Examples 3 and 4 are the comparative experiments of Examples 1 and 2.

A material A and the solvent were mixed by the following composition and the solid contents in the material A was dissolved into the solvent. In this way, the dope 24 having 20 wt. % of the solid electrolyte was produced. The dope 24 is hereinafter referred to as a dope A. Note that the material A was sulfonated polyacrylonitrile butadiene styrene with a sulfonation rate of 35%.

| Material A | 100 pts. wt |
|---|---|
| Solvent (N,N-dimethylformamide) | 400 pts. wt |

Note that the material A was synthesized in accordance with the following synthetic methods.

(1) Synthesis of 4-(4-(4-pentylcyclohexyl)phenoxymethyl) styrene

Substances of the compositions as shown below were reacted at 100° C. for 7 hours, and the obtained reaction liquid was cooled to reach a room temperature. After that, water was added to the reaction liquid so as to generate 4-(4-(4-pentylcyclohexyl)phenoxymethyl)styrene as a crystal. After the filtration of the liquid, the crystal was purified by an aqueous solution of water/acetonitrile (1:1), and air-dried. In this way, 4-(4-(4-pentylcyclohexyl)phenoxymethyl)styrene was obtained.

| 4-(4-pentylcyclohexyl)phenol | 14 pts. wt |
|---|---|
| 4-chloromethylstyrene | 9 pts. wt |
| Potassium carbonate | 11 pts. wt |
| N,N-dimethylformamide | 66 pts. wt |

(2) Synthesis of Graft Copolymer

A mixture having a composition as shown below was heated to reach 60° C.

| Polybutadiene latex | 100 pts. wt |
|---|---|
| Potassium rosinate | 0.83 pts. wt |
| Dextrose | 0.50 pts. wt |
| Sodium pyrophosphate | 0.17 pts. wt |
| Ferrous sulfate | 0.08 pts. wt |
| Water | 250 pts. wt |

After that, a mixture having a composition as shown below was delivered by drops into the above-described mixture for 60 minutes so as to perform polymerization reaction.

| Acrylonitrile | 21 pts. wt |
|---|---|
| 4-(4-(4-pentylcyclohexyl)phenoxymethyl)styrene | 62 pts. wt |
| t-dodecyl thiol | 0.5 pts. wt |
| cumene hydroperoxide | 3.0 pts. wt |

After the dropwise addition had completed, 0.2 pts.wt of cumene hydroperoxide was added thereto, and cooled for 1 hour. In this way, latex was obtained. The obtained latex was fed into a 1% sulfuric acid of 60° C., and heated up to 90° C. to be coagulated. The latex was then washed well with water and dried. In this way, graft copolymer was obtained.

(3) Synthesis of Material A by sulfonation of Graft Copolymer 100 pts.wt of the graft copolymer synthesized in (2) was dissolved into 1300 pts.wt of dichloromethane. While the obtained liquid was maintained at 0° C. or lower, 13 pts.wt of concentrated sulfuric acid was slowly added thereto. The mixture was stirred for 6 hours so as to cause a precipitation. After the solvent was removed therefrom, the precipitation was dried. In this way, sulfonated polyacrylonitrile butadiene styrene as the material A was obtained. Introduction rate of a sulfonic acid group by the dropwise addition was 35%.

[Production of Solid Electrolyte Membrane 62]

The dope A was cast onto the running belt 82 from the casting die 81 so as to form the casting membrane 24a. Temperature inside of the casting chamber 63 was maintained at 80° C. by the temperature regulator 97. In order not to directly apply the dry air to the bead and the casting membrane 24a for 2 seconds after the casting, the air shielding plate 95 was provided, and static pressure fluctuation near the casting die 81 was controlled within the range of ±1 Pa or less. After that, the casting membrane 24a on the belt 82 was dried by the dry air from the first blower unit 91 with the slit nozzles, and the dry air sent parallel to the casting membrane 24a from the second, third and fourth blower units 92, 93 and 94. The first blower unit 91 blew the dry air having the velocity of 2 m/sec, temperature of 80° C. and humidity of 10% RH to the exposed surface 24b of the casting membrane 24a in approximately same direction as the transporting direction thereof. After that, the second blower unit 92 sent the dry air having the velocity of 2 m/sec and temperature of 80° C. After a lapse of 120 seconds from the casting, the skin layer 24c was formed at the exposed surface 24b side of the casting membrane 24a. The thickness of the skin layer 24c was 10 μm. The third blower unit 93 sent the dry air having the velocity of 10 m/sec and temperature of 120° C. The fourth blower unit 94 sent the dry air having the velocity of 10 m/s and temperature of 100° C. Oxygen concentration in a dry atmosphere existing on the belt 82 was maintained at 5 vol %. In order to maintain the oxygen concentration at 5 vol %, gaseous nitrogen was used for substitution in air. Moreover, in order to condense and recover the solvent in the casting chamber 63, the condenser 98 was provided and an outlet temperature thereof was set at −10° C.

When a solvent ratio of the casting membrane 24a had reached 30 wt % on a dry basis, the casting membrane 24 was peeled from the belt 82 as the membrane 62 while supported by the peeling roller 109. Peeling speed (peeling roller draw) was properly adjusted within a range of 100.1% to 110% relative to the speed of the belt 82, for the purpose of preventing peeling defect. Surface temperature of the peeled membrane 62 was 60° C. Solvent vapor generated due to drying was condensed by the condenser 66 of −10° C. and was recovered by the recovery device 99. The recovered solvent was adjusted so as to make water content 0.5% or less. The dry air from which the solvent was removed was heated again and was recycled as the dry air. The membrane 62 was carried by the rollers of the transfer section 101 and was forwarded to the tenter drier 64.

The membrane 62 was forwarded to the tenter drier 64, and carried therein in a state that both side edges thereof were held by the clips 64a. In the tenter drier 64, the membrane 62 was dried by the dry air of 140° C. until a solvent content rate with respect to the solid contents reached 15 wt. %. Both side edges of the membrane 62 released from the clips 64a at the exit of the tenter drier 64 were cut off by the edge slitting device 67. The membrane 62 of which both side edges had been cut off was sent to and soaked in the first and second liquids 65a and 66a, which are 64 wt. % methanol aqueous solution maintained at 60° C., in the first and second baths 65 and 66, respectively. Thereby, liquid substitution of the methanol aqueous solution for N,N-dimethylformamide remained in the membrane 62 was sufficiently performed. The membrane 62 was pulled out of the second liquid 66a and sent to the drying chamber 69. In the drying chamber 69, the membrane 62 was dried in the range of 140° C. to 160° C. while transported by the rollers 68, and thus the solid electrolyte membrane 62 having less than 1 wt. % of remaining solvent amount on a dry basis was obtained.

The obtained membrane 62 was evaluated in each of the following items. Evaluation results are shown in Table 1. Note that the number of the evaluation items in Table 1 correspond to the number assigned to each of the following items.

1. Thickness

Thickness of the membrane 62 was continuously measured at a speed of 600 mm/min. by the use of an electronic micrometer manufactured by Anritsu Electric Co., Ltd. Data obtained by the measurement was recorded on a chart on a scale of 1/20, at a chart speed of 30 mm/min. After obtaining measurements of data curve by a ruler, an average thickness value of the membrane 62 and thickness unevenness relative to the average thickness value were obtained based on the obtained measurements. In Table 1, (a) represents the average thickness value (unit: μm) and (b) represents the thickness unevenness (unit: μm) relative to (a).

2. Remaining Solvent Amount

The membrane 62 was cut out into a portion of 7 mm×35 mm and the remaining solvent amount thereof was measured by the use of a gas chromatography (model GC-18A manufactured by Shimazu Corporation).

3. Proton Conductivity Coefficient

On the obtained solid electrolyte membrane 62, ten measurement points each of which is 1 m apart from one another were selected along a longitudinal direction of the membrane 62. These ten measurement points were cut out into circular sample having a diameter of 13 mm. Each sample was interposed by a pair of stainless plates, and the proton conductivity coefficient of the sample was measured in accordance with the AC impedance method by the use of a Multichannel Battery Test System 1470 and 1255B manufactured by Solartron Co., Ltd. The measurement was performed under the condition of a temperature at 80° C. and a relative humidity of 95%. The proton conductivity is represented by a value of the AC impedance (unit: S/cm) as shown in Table 1.

4. Output Density of Fuel Cell 141

The fuel cell 141 using the membrane 62 was formed, and output thereof was measured. According to the following methods, the fuel cell 141 was formed, and the output density thereof was measured.

(1) Formation of Catalyst Sheet A as Catalyst Layers 132b, 133b 2 g of platinum-supporting carbon was mixed with 15 g of the solid electrolyte (5% DMF solution), and dispersed for 30 minutes with an ultrasonic disperser. The mean particle size of the resulting dispersion was about 500 nm. The dispersion was applied onto a carbon paper having a thickness of 350 μm and dried, and a circular disc having a diameter of 9 mm was blanked out of it. This is catalyst sheet A. Note that the above-mentioned platinum-supporting carbon was Vulcan XC72 with 50 wt. % of platinum, and the solid electrolyte was same as those used for producing the membrane 62.

(2) Formation of MEA 131

The catalyst sheet A was attached to both surfaces of the solid electrolyte membrane 62 in such a manner that the coated face of the catalyst sheet A was contacted with the membrane 62, and thermally adhered for 2 minutes at a temperature of 80° C. under a pressure of 3 MPa. In this way, a MEA 131 was formed.

(3) Output Density of Fuel Cell 141

The MEA fabricated in (2) was set in a fuel cell as shown in FIG. 7, and an aqueous 15 wt. % methanol solution was fed into the cell via the anode-side opening 151. At this time, the cathode-side opening 152 was kept open to air. The anode 132 and the cathode 133 were connected to the Multichannel Battery Test System (Solartron 1470), and the output density (unit: $W/cm^2$) was measured.

EXAMPLE 2

A material B and the solvent ware mixed by the following composition and the solid contents in the material B was dissolved into the solvent. In this way, the dope 24 having 20 wt. % of the solid electrolyte was produced. The dope 24 is hereinafter referred to as a dope B. Note that the material B was sulfopropylationed polyether sulfone with a sulfonation rate of 35%, and it was produced in accordance with the synthetic method disclosed in Japanese Patent Laid-Open Publication No. 2002-110174.

| | |
|---|---|
| Material B | 100 pts. wt |
| Solvent (N-methylpyrrolidone) | 400 pts. wt |

[Production of Solid Electrolyte Membrane 62]

Besides the dope B was cast onto the running belt 82 from the casting die 81 so as to form the casting membrane 24a, and drying conditions described in the following, the membrane 62 was produced under the same conditions as Example 1. After a lapse of 80 seconds from the casting, the skin layer 24c was formed at the exposed surface 24b side of the casting membrane 24a. As the drying conditions of Example 2, the dry air from the second blower unit 92 was regulated to have the velocity of 2 m/sec and the temperature of 80° C., the dry air from the third blower unit 93 was regulated to have the velocity of 10 m/sec and the temperature of 140° C., and the dry air from the fourth blower unit 94 was regulated to have the velocity of 10 m/sec and the temperature of 140° C. Moreover, the dry air of the drying zone in the tenter drier 64 was regulated to have the temperature of 160° C., and the drying temperature of the drying chamber 69 was regulated to be in the range of 160° C. to 180° C. Besides these conditions, the membrane 62 was produced under the same conditions as Example 1. Surface temperature of the membrane 62 peeled by the peeling roller 109 was 70° C. Evaluation results of the obtained membrane 62 are shown in Table 1.

EXAMPLE 3

Besides the velocity of the dry air from the first blower unit 91 was regulated to 12 m/sec, a solid electrolyte membrane was produced in the same manner as Example 1, by preparing the dope A. After a lapse of 40 seconds from the casting, the skin layer 24c was formed at the exposed surface 24b side of the casting membrane 24a. Evaluation results of the obtained membrane are shown in Table 1.

EXAMPLE 4

Besides the velocity of the dry air from the first blower unit 91 was regulated to 12 m/sec, a solid electrolyte membrane was produced in the same manner as Example 2, by preparing the dope B. After a lapse of 40 seconds from the casting, the skin layer 24c was formed at the exposed surface 24b side of the casting membrane 24a. Evaluation results of the obtained membrane are shown in Table 1.

EXAMPLE 5

In this Example, a compound represented by the chemical formula 1 was used as the solid electrolyte. Note that protonation for obtaining the compound represented by the chemical formula 1, namely acid treatment was not performed before dope production, but during the dope production as described below. Non-protonated compound of the chemical formula 1, namely the precursor of the solid electrolyte was a material D. The material D was dissolved into the solvent to be a dope for casting. The method of producing the dope is same as the method of producing the dope 24 in Example 1. The solvent was a mixture of the solvent ingredients 1 and 2. The solvent ingredient 1 was a good solvent of the material D, and the solvent ingredient 2 was a poor solvent of the material D. In Example 5, X was Na, Y was $SO_2$ and Z had a structure shown as (I) of the chemical formula 2 in the chemical formula 1, and n was 0.33 and m was 0.67. Number average molecule weight Mn was 61000 and weight average molecular weight Mw was 159000.

| | |
|---|---|
| Material D | 100 pts. wt |
| Solvent ingredient 1 (dimethylsulfoxide) | 256 pts. wt |
| Solvent ingredient 2 (methanol) | 171 pts. wt |

The PET film was used as the web. The PET film was a lengthy material and continually transported. The casting membrane 24a was formed on the web and sent to the casting chamber 63. The temperature of the casting chamber 63 was regulated at 80° C. The first blower unit 91 blew the dry air having the velocity of 2 m/sec, temperature of 80° C. and humidity of 10% RH to the exposed surface 24b of the casting membrane 24a in approximately same direction as the transporting direction thereof. After a lapse of 80 seconds from the casting, the skin layer 24c was formed at the exposed surface 24b side of the casting membrane 24a. The thickness of the skin layer 24c was 12 μm. The second blower unit 92 sent the dry air having the velocity of 2 m/sec and the temperature of 120° C. The third blower unit 93 sent the dry air having the velocity of 2 m/sec and the temperature of 100° C. The fourth blower unit 94 sent the dry air having the velocity of 5 m/sec and the temperature of 80° C. The casting membrane 24a having the skin layer 24c was guided to a bath storing purified water of 25° C., and peeled from the PET film therein as the precursor membrane containing the material D, which was the precursor of the solid electrolyte. This membrane was made from the material D, therefore it was referred to as the precursor membrane. The contact with the purified water in the bath was performed in 5 minutes. Owing to this 5 minutes contact with the purified water, at least part of the solvent in the casting membrane or the precursor membrane was substituted by the purified water.

Next, the purified water was removed from the precursor membrane, which had sent out of the bath, with the use of an air shower. The precursor membrane was then sent to the tenter drier 64. In the tenter drier 64, the precursor membrane was dried by the dry air of 120° C. such that the solvent content rate with respect to the solid contents thereof reached less than 10 wt. %. The drying in the tenter drier 64 was performed for 10 minutes. The precursor membrane was released from the clips 64a at the exit of the tenter drier 64 and both side edges of the precursor membrane, which had been held by the clips 64a, were cut off by the edge slitting device 67 provided downstream of the tenter drier 64.

The acid treatment was performed over the precursor membrane of which both side edges had been cut off, and the washing step was performed. The acid treatment here means a treatment to bring the precursor membrane into contact with the aqueous solution containing the acid. In this example, the aqueous solution containing the acid was continuously supplied to the bath, and the acid treatment was performed by soaking the precursor membrane into the aqueous solution. Owing to this acid treatment, the material D came to have the structure represented by the chemical formula 1. That is, the membrane having the solid electrolyte was formed from the precursor membrane by the acid treatment. After the acid treatment, the membrane was washed with water. After going through the washing step, the membrane was sent to the drying chamber 69, and dried in the range of 120° C. to 185° C.

EXAMPLE 6

The material D in Example 5, which is the precursor of the solid electrolyte, was replaced by a material E. In the material E, X was Na, Y was $SO_2$ and Z had a structure shown as (I) and (II) of the chemical formula 2 in the chemical formula 1, and n was 0.33 and m was 0.67. Number average molecule weight Mn was 68000 and weight average molecular weight Mw was 200000. In the chemical formula 2, (I) is 0.7 mol % and (II) is 0.3 mol %. The solvent was a mixture of the solvent ingredients 1 and 2 as shown below. The solvent ingredient 1 was a good solvent of the material E, and the solvent ingredient 2 was a poor solvent of the material E. Besides that, the membrane was produced under the same conditions as Example 5.

| Material E | 100 pts. wt |
|---|---|
| Solvent ingredient 1 (dimethylsulfoxide) | 200 pts. wt |
| Solvent ingredient 2 (methanol) | 135 pts. wt |

EXAMPLE 7

The membrane was produced in the almost same manner as Example 5. In Example 7, the precursor membrane was obtained by peeling the casting membrane from the PET film after the casting membrane was fed out of water. In addition, after the washing step, the membrane was soaked in water of 30° C. for 5 minutes and then water was removed from the membrane.

EXAMPLE 8

Besides the material D, which is the precursor of the solid electrolyte, was replaced by the material E, the membrane was produced in the almost same manner as Example 7.

The membranes obtained from Examples 1 to 8 were evaluated in each item described in Example 1. Evaluation results are shown in Table 1. Note that the number of the evaluation items in Table 1 correspond to the number assigned to each of the following items.

TABLE 1

| | Evaluation Item | | | | |
|---|---|---|---|---|---|
| | 1 (μm) | | 2 (wt. %) | 3 (S/cm) | 4 (W/cm²) |
| | (a) | (b) | | | |
| Example 1 | 51 | ±1.6 | 0.4 | 0.09-0.11 | 0.47-0.51 |
| Example 2 | 52 | ±1.8 | 0.3 | 0.10-0.11 | 0.51-0.56 |
| Example 3 | 52 | ±2.8 | 10.4 | 0.06-0.07 | 0.32-0.38 |
| Example 4 | 51 | ±2.9 | 9.7 | 0.07-0.08 | 0.37-0.41 |
| Example 5 | 51 | ±1.5 | 0.4 | 0.11-0.13 | 0.49-0.52 |
| Example 6 | 52 | ±1.6 | 0.3 | 0.12-0.14 | 0.49-0.53 |
| Example 7 | 51 | ±1.5 | 0.3 | 0.12-0.15 | 0.50-0.52 |
| Example 8 | 51 | ±1.5 | 0.3 | 0.13-0.15 | 0.50-0.53 |

From the results of the above-mentioned examples, it will be understood that it is possible to remove the remaining solvent more reliably according to Examples 1, 2, 5, 6, 7 and 8, as compared to comparative Examples 3 and 4. Accordingly, the remaining solvent amount of the solid electrolyte membranes produced in Examples 1, 2, 5, 6, 7 and 8 are reduced as compared to those produced in comparative Examples 3 and 4. Moreover, owing to the formation of the skin layer on the casting membrane, it is possible to continuously produce the solid electrolyte membrane having excellent planarity and reduced defects. Especially, Examples 5, 6, 7 and 8 show that such effects are realized according to the present invention. That is, the solid electrolyte membrane produced according to the present invention realizes an excellent ionic conductivity. Therefore, it will be understood that the obtained solid electrolyte membrane can be appropriately used for the fuel cell.

INDUSTRIAL APPLICABILITY

The solid electrolyte membrane, the method and the apparatus of producing the same, the membrane electrode assembly and the fuel cell using the solid electrolyte membrane of the present invention are applicable to the power sources for various mobile appliances and various portable appliances.

The invention claimed is:

1. A method of producing a solid electrolyte membrane, the method comprising steps of:
    (a) casting a dope containing a solid electrolyte and an organic solvent from a casting die onto a running support so as to form a casting membrane;
    (b1) drying an exposed surface side of the casting membrane by applying dry air having a velocity of less than 3 m/s so as to form a skin layer as part of said casting membrane at the exposed side surface, a thickness of the skin layer after a lapse of 60 seconds from said casting being in a range from 2% to 40% of that of the casting membrane as a whole, and the skin layer having a surface tension different from that of a support side of the casting membrane;
    (b2) separately drying the casting membrane having said skin layer by applying dry air having a velocity higher than the velocity of dry air applied in said step (b1) so as to provide the casting membrane having said skin layer with a self-supporting property;

(c) peeling the self-supporting casting membrane from the support as a wet membrane containing said organic solvent;
(d) drying the wet membrane so as to form said solid electrolyte membrane; and
(e) bringing the wet membrane before said step (d) into contact with a liquid having a boiling point lower than that of said organic solvent, the liquid being a poor solvent of the solid electrolyte.

2. The method of claim 1, wherein said step (b1) is conducted using a first blower unit and said step (b2) is conducted using a plurality of blower units.

3. The method of claim 1, wherein said step (b1) is performed in a chamber having one of a slit nozzle or a two-dimensional nozzle, the slit nozzle sending said dry air from a slit provided to face said exposed surface side, and the two-dimensional nozzle sending dry air from a first opening and suctioning air around the casting membrane into a second opening, each of said first and second openings provided to face said exposed surface side.

4. The method according to claim 1, wherein a remaining solvent amount of the casting membrane is 150 wt. % or more and 500 wt. % or less on a dry basis at a time when step (b1) is started.

5. The method according to claim 1, wherein the dry air in said step (b1) has a humidity of 20% RH or less.

6. The method according to claim 1, wherein said step (d) comprises absorbing and recovering solvent vapor generated due to evaporation.

7. The method according to claim 1, further comprising repeating step (e) at least once.

8. The method according to claim 7, wherein said step (e) is conducted twice, and wherein a second liquid for the second contact has a compound having a lower boiling point than a compound included within a first liquid for the first contact.

9. The method according to claim 1, wherein said step (e) is conducted by soaking one of the casting membrane and the wet membrane in said liquid.

10. The method according to claim 1, wherein said organic solvent is a mixture of a poor solvent and a good solvent of the solid electrolyte.

11. The method according to claim 10, wherein a weight ratio of said poor solvent in said organic solvent is 10% or more and less than 100%.

12. The method according to claim 10, wherein said good solvent contains dimethylsulfoxide and said poor solvent contains an alcohol having 1 to 5 carbons.

13. The method according to claim 1, wherein said solid electrolyte is a hydrocarbon polymer.

14. The method according to claim 13, wherein said hydrocarbon polymer is an aromatic polymer having a sulfonic acid group.

15. The method of claim 13, wherein said hydrocarbon polymer is a copolymer composed from each structure unit represented as formulae (I), (II) and (III) of a chemical formula 1:

[Chemical Formual 1]

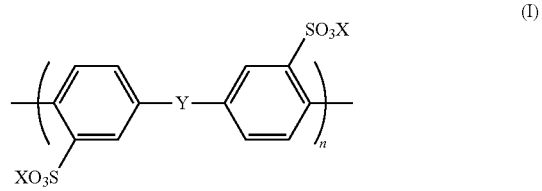

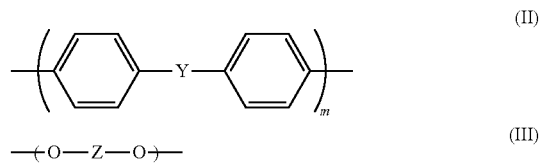

wherein, X is H or a monovalent cationic species, Y is $SO_2$ and Z has a structure shown as a formula (I) or (II) of a chemical formula 2, and n and m satisfy the following condition: $0.1 \leq n/(m+n) \leq 0.5$;

[Chemical Formula 1]

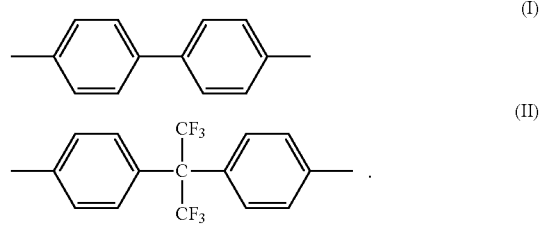

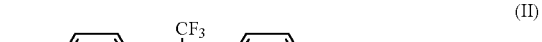

* * * * *